US006269354B1

(12) United States Patent
Arathorn

(10) Patent No.: US 6,269,354 B1
(45) Date of Patent: Jul. 31, 2001

(54) GENERAL PURPOSE RECOGNITION E-CIRCUITS CAPABLE OF TRANSLATION-TOLERANT RECOGNITION, SCENE SEGMENTATION AND ATTENTION SHIFT, AND THEIR APPLICATION TO MACHINE VISION

(76) Inventor: David W. Arathorn, 6068 Margarido, Oakland, CA (US) 94618

( * ) Notice: Subject to any disclaimer, the term of this patent is extended or adjusted under 35 U.S.C. 154(b) by 0 days.

(21) Appl. No.: 09/201,414

(22) Filed: Nov. 30, 1998

(51) Int. Cl.[7] .................................................. G06G 7/00
(52) U.S. Cl. .................................................. 706/27; 706/38
(58) Field of Search .................................... 706/27, 38

(56) References Cited

U.S. PATENT DOCUMENTS

| | | | |
|---|---|---|---|
| 4,773,024 | * 9/1988 | Faggin et al. | 706/20 |
| 4,901,271 | * 2/1990 | Graf | 706/34 |
| 5,004,932 | 4/1991 | Nejime | 326/36 |
| 5,131,072 | * 7/1992 | Yoshizawa et al. | 706/38 |
| 5,170,463 | * 12/1992 | Fujimoto et al. | 706/41 |
| 5,235,650 | 8/1993 | Jeong | 382/158 |
| 5,274,746 | * 12/1993 | Mashiko | 706/34 |
| 5,293,458 | * 3/1994 | Chung et al. | 706/39 |
| 5,299,285 | * 3/1994 | Tawel | 706/25 |
| 5,323,471 | 6/1994 | Hayashi | 382/158 |
| 5,396,581 | * 3/1995 | Mashiko | 706/39 |
| 5,420,963 | * 5/1995 | Kuwata | 706/22 |
| 5,581,660 | 12/1996 | Horan | 706/40 |
| 5,587,668 | 12/1996 | Shibata et al. | 326/36 |
| 5,704,016 | 12/1997 | Shigematsu et al. | 706/41 |

OTHER PUBLICATIONS

Kandel, M.D., Eric R., "Principles of Neural Science", Second Edition, *Elsevier Science Publishing Co.*, 1985, Part V, Chap. 29, pp. 372–381.

(List continued on next page.)

Primary Examiner—George B. Davis
(74) Attorney, Agent, or Firm—Fliesler Dubb Meyer & Lovejoy LLP

(57) ABSTRACT

The invention comprises e-circuits built from basic modules of e-cells which are capable of: recognizing a previously memorized percept anywhere within an arbitrarily large input field without incurring delay related to size of the search space; isolating a previously memorized percept within the input field when in the adjacent presence of other percepts and closely related distractors; locating and recognizing all occurrences of a repeated subfield within the input field, even in the presence of closely related distractors; and performing sequential shift attention between a number of different percepts in the input field. The invention is applicable to various recognition tasks including those in sensory domains such as speech and music recognition, vision, olefaction, and touch. The invention also comprises a method to apply these e-circuits specifically to the task of learning and recognizing subjects in images in any two dimensional signal space under translation, and if necessary, scaling, rotation and other transforms.

29 Claims, 25 Drawing Sheets

OTHER PUBLICATIONS

Martin, John H.., "Principles of Neural Science", Second Edition, *Elsevier Science Publishing Co.,* 1985, Part VIII, Chap. 48, pp. 637, 639.

Shepard, Gordon and Koch, Christof, "The Synaptic Organization of the Brain", Third Edition, *Oxford University Press,* 1990, pp. 22–23, 26–27.

Douglas, Rodney J. and Martin, Kevan A.C., "The Synaptic Organization of the Brain", Third Edition, *Oxford University Press,* 1990, pp. 404–405.

Shepard, Gordon, "Computational Neuroscience", *MIT Press,* 1990, Chap. 8, pp. 88, 93.

Feldman, Jerome A., "Computational Neuroscience", *MIT Press,* 1990, pp. 170–171.

Fuster, M. Joaquin, "Memory in the Cerebral Cortex", *MIT Press,* 1995, Chap. 4, pp. 50–51.

Contreras, et al., "Control of Spatiotemporal Coherence of a Thalamic Oscillation by Corticothalamic Feedback", *Science,* vol. 274, Nov. 1, 1996, pp. 771–774.

Diorio, et al., "A Single Transistor Silicon Synapse", *IEEE Transactions on Electron Devices,* vol. 43, No. 11, Nov. 1996, pp. 1972–1980.

Karayiannis, N.B. et al., "Fuzzy Pattern Classification Using Feedforward Neural Networks with Multilevel Hidden Neurons", 1994 International Conference on Neural Networks, IEEE World Congress on Computational Intelligence , Jul. 1994, vol. 3, pp. 1577–1582.

Malinowski, A. et al., "Capabilities and Limitations of Feedforward Neural Networks with Multilevel Neurons", 1995 IEEE International Symposium on Circuits and Systems, May 1995, vol. 1, pp. 131–134.

Kamat, H.V. et al., "Direct Adaptive Control of Nonlinear Systems Using a Dynamic Neural Network", IEEE/IAS International Conference on Industrial Automation and Control 1995, Jan. 1995, pp. 269–274.

Liaw, Jim–Shih et al., "Computing with Dynamic Synapses: a Case Study of Speech Recognition" International Conference on Neural Networks 1997, Jun. 1997, vol. 1, pp. 350–355.

Callegari et al, "Cell Biasing Balancing in E–Cell Based Single–Ended Log Filters", IEEE International Conference on Electronics, Circuits and Systems, Sep. 1998.*

Verleysen et al, "A High–Storage Capacity Content–Addressable Memory and Its Learning Algorithm", IEEE Transaction on Circuits and Systems, May 1989.*

Verleysen et al, "Neural Networks for High–Storage Content–Addressable Momory: VLSI Circuits and Learning Algorithm", IEEE Journal of Solid–State Circuits, Jun. 1989.*

* cited by examiner

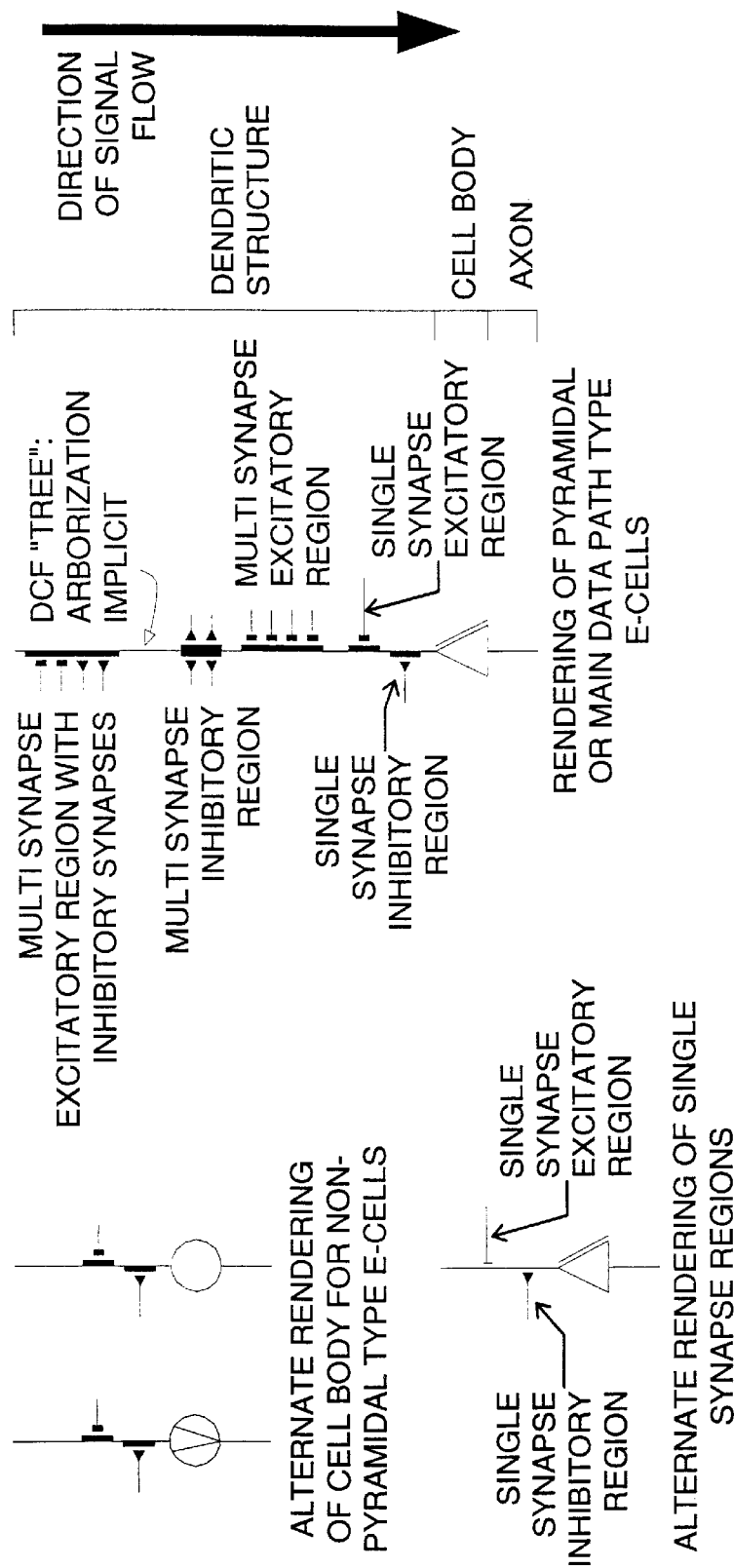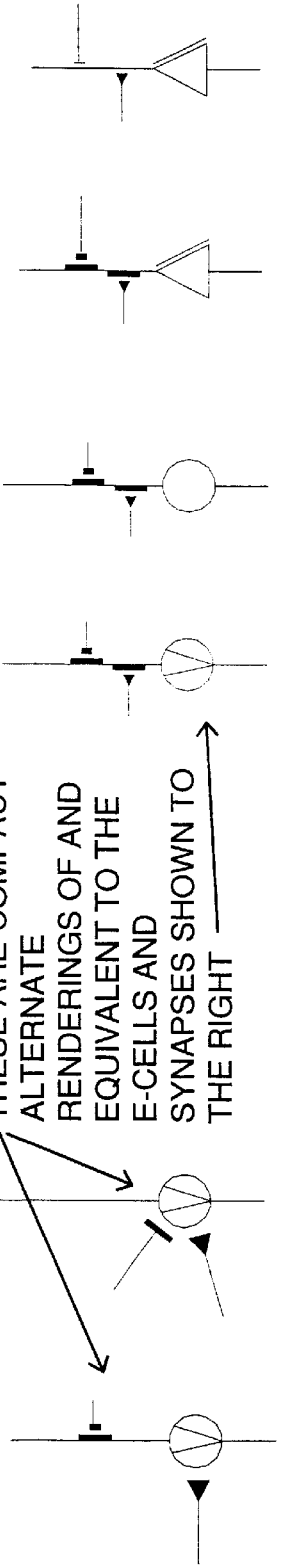
FIG.-1A

STAGE m FORWARD ACTIVITY

STORED PERCEPTS: <go, ol, la, ab, bu>, <pa, ad, do, ot, ti>,
<bi, id, da, ak, ku>, <tu, up, pi, ir, ro>
TEST SIGNAL: < bi, id, da, ak, ku, ut, tu, up, pi, ir>
|     SUBJECT     |  | DISTRACTOR |
(AS PROJECTED ON STAGE r)

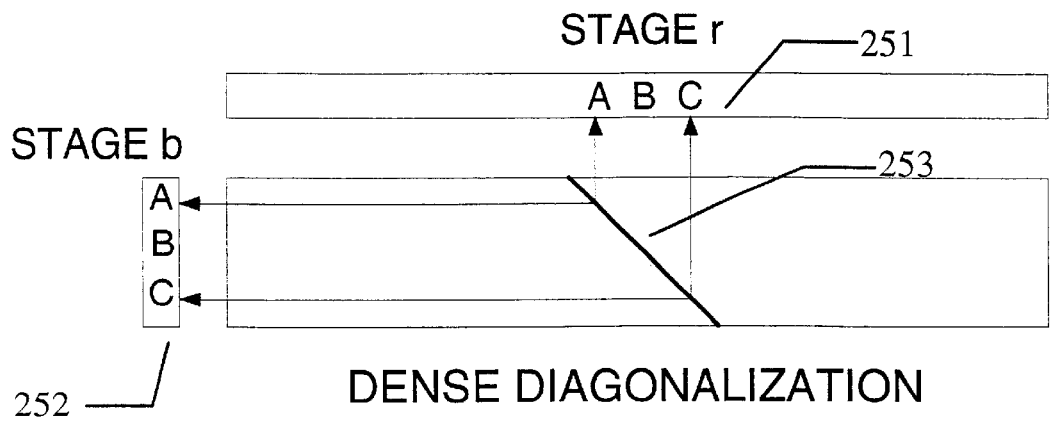
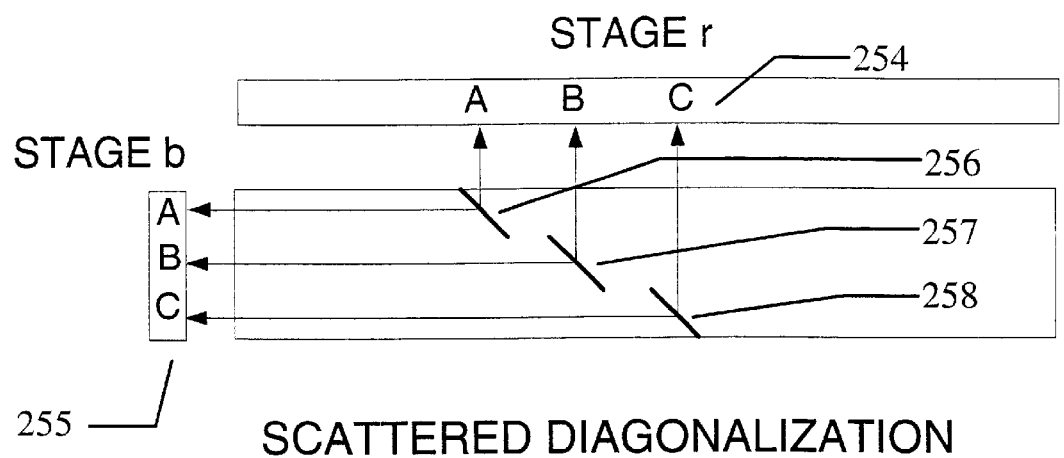
FIG.-4

STAGE r BACKWARD RESPONSE WITHOUT R-MATCH
DIAGONALIZATION

STAGE r BACKWARD RESPONSE WITH R-MATCH DIAGONALIZATION
STORED PERCEPTS: <golabu, padoti, bidaku, tupiro>
TEST SIGNAL : <akbidakuidbidakukudabibidakubikudaxxxxxx>
  | subj |  | subj |     | subj |
       as projected on stage t
                    note: x is a non-feature STAGE r FORWARD ACTIVITY DURING ATTENTION SHIFTS
PERCEPTS:      <bidaku>, <tupiro>, <padoti>, <golabu>
TEST SIGNALS:  <xxxgolabubidakutupiroxxxxxxxxxxxxxxxxxxx>
(all as presented to stage $t$)
ACTIVATIONS ON INDIVIDUAL X-EMES:

'b' = (/ 0.9, 0.0, 0.0, 0.0, 0.0, 0.0, 0.0, 0.0, 0.0, 0.0, 0.0, 0.0 /)
'd' = (/ 0.0, 0.75, 0.0, 0.0, 0.0, 0.0, 0.0, 0.0, 0.0, 0.0, 0.0, 0.0 /)
'g' = (/ 0.0, 0.0, 0.93, 0.0, 0.0, 0.0, 0.0, 0.0, 0.0, 0.0, 0.0, 0.0 /)
'k' = (/ 0.0, 0.0, 0.0, 0.75, 0.0, 0.0, 0.0, 0.0, 0.0, 0.0, 0.0, 0.0 /)
'l' = (/ 0.0, 0.0, 0.0, 0.0, 0.93, 0.0, 0.0, 0.0, 0.0, 0.0, 0.0, 0.0 /)
'p' = (/ 0.0, 0.0, 0.0, 0.0, 0.0, 1.0, 0.0, 0.0, 0.0, 0.0, 0.0, 0.0 /)
'r' = (/ 0.0, 0.0, 0.0, 0.0, 0.0, 0.0, 1.0, 0.0, 0.0, 0.0, 0.0, 0.0 /)
't' = (/ 0.0, 0.0, 0.0, 0.0, 0.0, 0.0, 0.0, 1.0, 0.0, 0.0, 0.0, 0.0 /)
'a' = (/ 0.0, 0.0, 0.0, 0.0, 0.0, 0.0, 0.0, 0.0, 1.0, 0.0, 0.0, 0.0 /)
'i' = (/ 0.0, 0.0, 0.0, 0.0, 0.0, 0.0, 0.0, 0.0, 0.0, 1.0, 0.0, 0.0 /)
'o' = (/ 0.0, 0.0, 0.0, 0.0, 0.0, 0.0, 0.0, 0.0, 0.0, 0.0, 1.0, 0.0 /)
'u' = (/ 0.0, 0.0, 0.0, 0.0, 0.0, 0.0, 0.0, 0.0, 0.0, 0.0, 0.0, 0.9/)
'x' = (/ 0.0, 0.0, 0.0, 0.0, 0.0, 0.0, 0.0, 0.0, 0.0, 0.0, 0.0, 0.0 /)

GENERAL PURPOSE RECOGNITION E-CIRCUITS CAPABLE OF TRANSLATION-TOLERANT RECOGNITION, SCENE SEGMENTATION AND ATTENTION SHIFT, AND THEIR APPLICATION TO MACHINE VISION

This application is related to provisional application number 60/067,125 Title: "Methods and Apparatuses For Implementing Equivalent Cells, Memory Circuits, General Purpose Recognition Circuits, and Machine Vision Systems, filed Dec. 2, 1997." It is also related to utility patent application, serial number 09/201,395, entitled "E-Cell (Equivalent Cell) and The Basic Circuit Modules of E-Circuits: E-Cell Pair Totem, The Basic Memory Circuit and Association Extension," filed on even date herewith, both of which are incorporated herein by reference.

BACKGROUND OF THE INVENTION

1. Field of Invention

The invention pertains to the fields of pattern recognition, scene segmentation, machine vision and machine speech recognition, and neuromorphic engineering. The invention constitutes a group of elementary circuits composed of interconnected e-cells (the subject of a related application) that themselves can be assembled into a new class of systems to implement perceptual and cognitive functions in various sensory and cognitive domains.

2. Discussion of Related Art

The history of neurologically inspired computing technology goes back at least several decades. The field lay relatively quiescent until the mid 1980s when the popularization of the multi-layer "artificial neural net" (ANN), usually emulated in software, overcame a decade and a half of skepticism about the technology largely engendered by an influential book "Perceptrons" by Marvin Minsky and Seymour Papaert. The multilayer ANN, particularly ones trained by various algorithms of backward propagation of an error signal, proved capable of a wide range of classification tasks. Though the differences between ANNs and biological neural circuitry was evident, the lack of an alternative computational hypothesis for the biological circuitry at first attracted some in the neuroscience community to adopt the ANN in its various forms as a model of neural computation. The limitations of the ANN, however, became apparent in both technological application and as a computational model for the brain. The ANN has become an accepted part of the computational repertoire for solving a certain classes of classification problems and problems involving capturing of complex functions from a large set of training data.

However, the ANN on its own has not provided the basis for solutions to the more complex problems of vision, speech recognition and other sensory and cognitive computation. Problems of segmentation, recognition of signals under various transformations, learning from single or very limited presentations of data, regularity extract, and many other real world recognition problem have to date eluded solution by ANN or any other neurally inspired techniques.

Experimental neuroscience has revealed that cortical and other neural architecture is far more complicated than any ANN. Realistic simulations of large neurons such as pyramidal or Purkinje cells suggest that individual neurons are capable of significant computation on their own, which must be the basis of the computations performed by circuits containing myriads of such cells. Experiment has also determined that connectivity between neurons is highly specific and becomes more so during the initial learning by organisms. Neurons themselves are specialized, not uniform. Strong evidence exists that synchronized oscillations across the cortices play a role in recognition. And perhaps most important is the fact that backward or descending signal paths are at least as numerous as the forward or ascending signal paths from sensory organs to progressively "higher" cortices.

BRIEF DESCRIPTION OF THE INVENTION

The invention consists of a number of e-circuits which are expansions of the basic memory e-circuit (subject of another application) to build a general purpose recognition e-circuit capable of learning presented patterns and later recognizing them, or subsets of them, when presented anywhere in an input field in the presence of other percepts and distractors. The invention implements translation invariant recognition, recognition under degradation due to noise or occlusion, input field segmentation, and attentional shift between concurrently presented patterns corresponding to memorized percepts.

In addition e-circuitry is added which permits patterns to be learned when presented anywhere in an input field, and compacted if broken up across the input field.

The basic memory e-circuit (subject of associated application E-Cell (Equivalent Cell) and The Basic Circuit Modules of E-Circuits: E-Cell Pair Totem, The Basic Memory Circuit and Association Extension) is extended by one standard e-cell pair stage, stage r. Stage r is richly interconnected to stage b, both forward and backward, allows features present anywhere across stage r to find a target region of stage m whose weights match its pattern of activation. The resulting e-circuit is capable of recognizing patterns in any translation, without incurring a time cost proportional to the space searched for a match, but also suffers from a complete of lack of order selectivity. As a result, anagrams of memorized percepts are recognized without distinction from the originally memorized pattern. In most applications this is not acceptable and must be remedied. The backward path activation permits e-circuitry to be added to the three-stage e-circuit which corrects the lack of order selectivity. These additional circuit enhancements are termed r-match and r-match diagonalization. With a relatively small addition of e-circuitry, the order enforcement by the recognition e-circuit can be made arbitrarily strict without imposing a time penalty on the recognition and without losing the translation tolerance (or invariance) of the e-circuit.

When multiple patterns corresponding to memorized percepts are presented in a single input field, it is useful in real applications to be able to split up the input field (segmentation) along the boundaries of the recognized percepts and identify each recognized percept with its local in the input field. This is the basis of sentence parsing and visual scene recognition. An attention focus enhancement to the recognition e-circuit, also driven from the recognition signal propagated along the backward path to stage r allow the circuit to shift attention between concurrently presented patterns in the input field.

The invention also consists of a method of application of the r-b-m e-circuit including the enhancements described in the associated applications to the problem of machine vision. The resulting recognition engine is capable of learning percept images and then recognizing and segmenting those percepts when they occur in a compound image even under transformations of translation, rotation and scaling as well as some perspective transforms. The recognition time for a given percept is independent of the size of the input field in which that percept occurs. Typical recognition latencies are three to six oscillatory cycles, and the switch of attention from one percept to another anywhere in the input field takes under a dozen oscillatory cycles. The real-time length of an oscillatory cycle is dependent on the implementation medium: for analog VLSI implementations, oscillatory frequencies in the megahertz range are practical.

The recognition characteristics of the r-b-m e-circuit are applied to two-dimensional patterns by suitable mapping between a two dimensional field of feature detectors and a locally one-dimensional extent of the input stage r. The characteristics of the feature detector field which provides input are independent of the invention described here. The circuit will store and recognize percepts characterized in whatever feature sets provide the input to the circuit.

The input stage r of the e-circuit samples the feature detector field in such a manner that areas of the image are mapped via an r-match/r-intersect "diagonal" onto stage b. Each "diagonal" is a surjective mapping of some subset of stage r e-cell pairs onto the full set of stage b e-cell pairs. All mapped subset of stage r e-cell pairs represent contiguous areas of the input feature field corresponding to translations and, if necessary, rotations, scalings and perspective transforms of the percept field. The ability of the diagonalizing r-b-m e-circuit to select the diagonal which best maps an active subset of stage r to some percept stored in stage m in one or a very few cycles of e-cell activity allow percepts present in the input image to be rapidly identified even when translated, rotated, etc. Furthermore, the ability of the r-b-m e-circuit equipped with attention focus circuitry to suppress input patterns once recognized, allows it to segment a presented scene by shifting its attention sequentially from percept to percept.

BRIEF DESCRIPTION OF THE DRAWINGS

Note: all density plot figures show the amplitude of activity of a group of e-cells (x-axis) over time measured in arbitrary units (y-axis), where the darkest trace corresponds to the highest amplitude, and zero amplitude is white.

FIG. 1A is a key to the symbols for the circuit diagrams based on the e-cell.

FIG. 4 illustrates diagonalization of contiguous and broken input fields: two different diagonalization "densities."

FIG. 14 illustrates an excitatory version of r-intersect, but an inhibitory version can also be implemented with the same degree of simplification.

FIGS. 17 (a) and 17 (b) shows in block form the connection pattern of the diagonals which map between stage r and stage b. The numbers above the rectangle designation stage r e-cell pairs correspond to the numbering of sampling areas in FIG. 16.

FIG. 23, second through sixth row, are test patterns which are presented to stage r. The heavy outline in the second row sampling pattern indicates the subsection of the pattern that was used to sample the training patterns, though the training data was entered through stage b and is therefore independent of location in the full sampling pattern. The targets are all translated in one or two dimensions relative to each other and distorted in some degree relative to the training sampling pattern. The translation of the pattern in the fourth, fifth and sixth rows are accommodated in the same e-circuit by shifting the entire sampling pattern. Sixth row shows targets in presence of distractors and noise. All target figures were successfully recognized by the e-circuit.

DETAILED DESCRIPTION OF THE INVENTION

PREFERRED EMBODIMENTS

Figure 1:
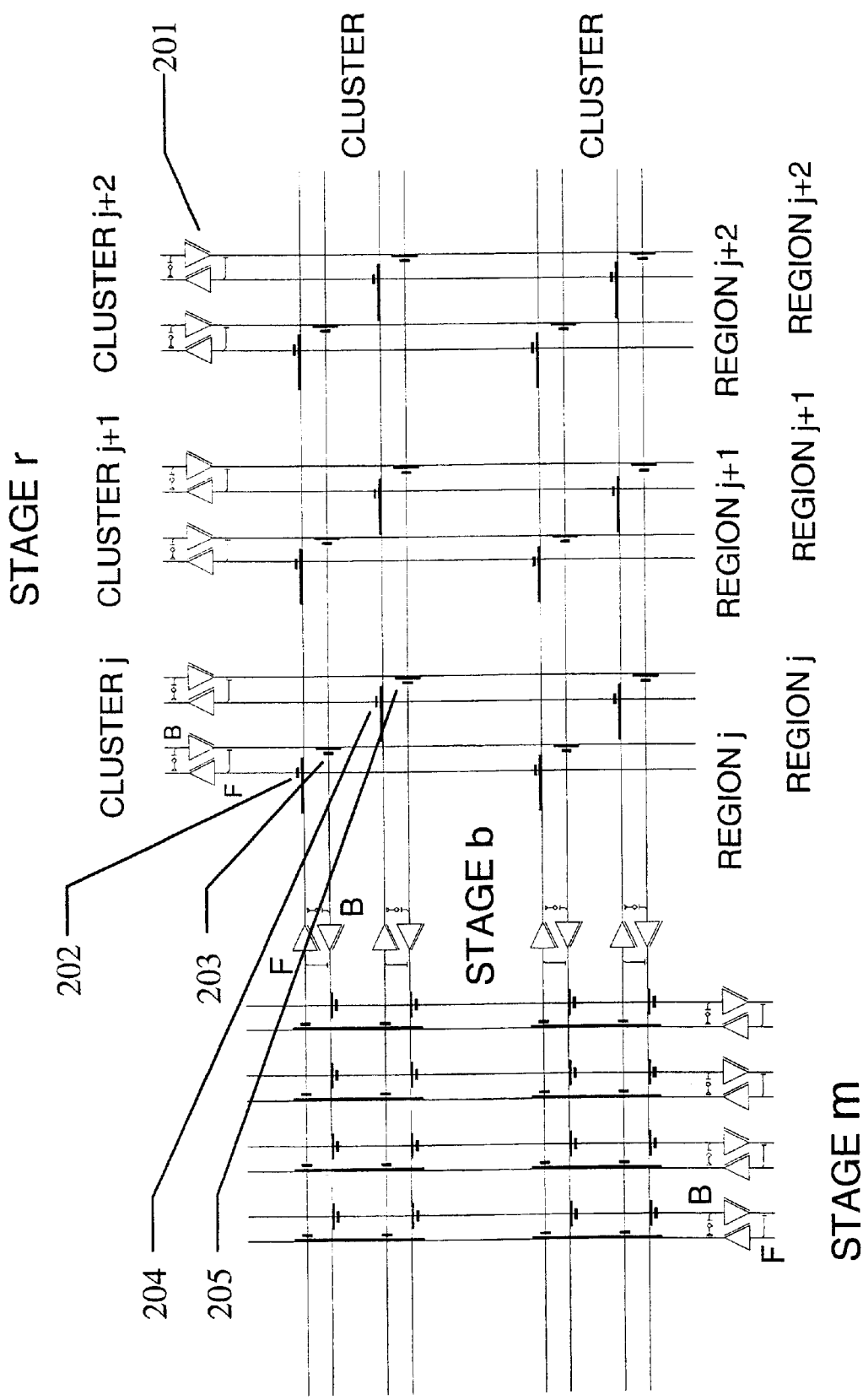
FIG. 1 shows the inter-stage connections of the r-b-m memory e-circuit.

Practical e-circuits typically involve large numbers (tens of thousands) of e-cells, and the connections between them are both numerous and highly specific to the function of each group of e-cells within the e-circuit. The design or specification of such e-circuits and the characteristics and configurations of the e-cells within them must therefore be tested before being committed to implementation in any uncorrectable medium.

The e-cell, and consequently the e-circuits composed of them, in practice require at least two embodiments:
1) a software simulation for verifying the configuration of all individual e-cells within an e-circuit and for verifying the pattern of interconnections between e-cells,
2) a hardware implementation capable of delivering the performance of the system necessary to the application.

In order for the software simulation to verify an e-circuit and e-cell system design, a common specification of the e-cells and e-circuit underlies both. In other words, the specification that completely configures and drives the software simulation can be compiled into a hardware specification for the preferred embodiments.

The particular hardware technology preferred for embodiment of the invention depends on the application. Three dimensions drive the choice: speed, scale and flexibility. Since the e-circuits built of e-cells function on principles derived from biological neural circuits, the necessary effective speed of the e-cells themselves is very slow compared to digital electronics. It is therefore practical to implement e-cells in analog electronic microcircuitry. All of the components of the e-cell have behavior that has already been implemented in various contexts in electronic microcircuitry. For small and moderate scale applications e-cell counts make it possible to build complete e-circuits on one or a few chips. However, the e-cell counts and interconnection densities necessary for e-circuits applicable to massive data domains such as vision may require deployment on many chips. The pin counts on current chip packaging, and trace density on printed circuit boards, impose a limitation on the interconnections if each e-cell whose output must be carried to another chip requires a dedicated pin or connector on the chip package. This problem has been addressed in other contexts, and various sampling and multiplexing schemes have been evolved in both commercial and experimental applications to solve the problem. (Example: John Lazzaro and John Wawrzynek, "A Multi-Sender Asynchronous Extension to the AER Protocol", Computer Science Division, UC Berkeley.) The generalized solution, of which there are several specific variants, consists of sampling the analog level of a multiplicity of outputs on-chip, encoding the level and identifying the source with an address code, and multiplexing a large quantity of these level-identity pairs onto a small set of chip connectors which communicate with a compatible bus to carry the signals between chips. All the destination chips have circuitry which monitor this bus and pick off and convert to analog those signals which are destined to devices on that chip. Thus a large quantity of connections between those two chips can be virtualized over limited hardware connections: the great difference of the operating frequency of the analog devices (such as e-cells) on chip and the speed of the multiplexed connections between the chips makes this practical.

For applications which require relatively low e-cell counts but frequent reconfiguration a purely digital embodiment is practical using low cost digital signal processors in various quantities. In this embodiment, the software simulation is directly deployed on the DSPs and distributed across a sufficient number to make the performance adequate to the application.

The detailed description of the e-cell is thus applicable to all the preferred embodiments. Particular equations describe dynamics which are efficient to implement the software simulation, since this is the starting point of all embodiments. The e-cell itself is very tolerant of variations in the particularity of its dynamics. The sigmoid equation of the cell body can be equally implemented by the input-output relation of most common transistors, for example, and this substitution has been common practice in electronically implemented ANNs which also rely on a sigmoidal transfer function.

Other variants on the electronic embodiment of the e-cell use (1) digitally stored synaptic weights, converted to analog for multiplication in the dot product, (2) sampled analog instead of continuous analog signals. The latter might be occasioned by power dissipation considerations or the multiplexing of devices on chip to virtualize large e-cell counts with a smaller number of transistors.

The difference equations expressing the behavior of the e-cell normally taken to represent inputs which are continuous or synchronously sampled. For e-cells implemented with asynchronously sampled inputs the equations are taken to represent the response to a spike or event density. The inputs in the equations are in this case the momentary value of a function integrating the amplitude and temporal density of actual input signal spikes or events on the corresponding input terminal.

The invention also has potential embodiments in optical and neurocellular technologies, although these are considered to be more distant in time and secondary to the analog, digital and hybrid analog and digital implementations.

The current software embodiment consists of a two section Fortran 90 program. The first part of the program takes as input a formal e-circuit description, including specification for the characteristics and configurations of the necessary e-cells, and compiles this specification into the data structures to drive the simulation. The second part of the program executes the simulation and records the behavior of an arbitrary set of e-cells specified as an appendage to the formal e-circuit specification. The input conditions for the simulation are specified separately. The program is structured to parallelize efficiently and distribute onto an arbitrary number of processors on either a distributed memory or shared memory parallel computer.

The e-circuit and e-cell specification has a formal syntax described in an extended BNF notation which is included as part of an associated application. As disclosed therein, the upstream stage, b, consists of a group of $k_b$ e-cell pairs structured as $p_b$ clusters of $q_b$ standard e-cell pairs. The downstream stage, m, consists of a group of $k_m$ standard e-cell pairs in a single cluster.

The r-b-m e-circuit with long diagonalization, as described later in this application, has particular architectural regularities which can be exploited to reduced the transistor count and complexity of an electronic embodiment. These embodiment features are described after the description of the circuits.

Translation Tolerance

The basic memory circuit (subject of an associated application E-Cell (Equivalent Cell) and The Basic Circuit Modules of E-Circuits: E-Cell Pair Totem, The Basic Memory Circuit and Association Extension) requires previously memorized patterns of activation to be applied to exactly the same $F_b$ (stage b forward) e-cells as during learning. This imposes restrictions on its application and the nature of the receptors and feature detectors upstream from it. For the circuit to be useful in identifying signals applied anywhere in its feature fields, it must be modified to implement translation tolerance. This and related capabilities are implemented by the extensions to the basic memory circuit described below. (For clarity, context and association extensions described in the associated utility application are ignored for the rest of this discussion, for they are independent of what is developed herein.)

Organization of the Base r-b-m Circuit

The base r-b-m e-circuit described is of very limited use on its own and must be enhanced by other circuitry. However, it provides the common foundation for the variants described afterward.

The basic two stage memory e-circuit is extended by a single totem stage upstream of stage b. The new stage, r, preserves the intra-cluster organization of stage b, but extends the number of clusters to accommodate an input field much larger than the cluster/region count of the basic memory circuit. This basic r-b-m e-circuit is shown in FIG. 1. (FIG. 1a shows the key to the symbols for this and all other e-circuit diagrams.) The extension to the basic memory e-circuit is shown i the grey area of FIG. 1.

Stage r consists of a group of $k_r$ e-cell pairs structured as $p_r$ clusters of $q_b$ standard e-cell pairs 201. As noted, $p_r \gg p_b$ where $p_b$ is the number of clusters in stage b. Stage r forward e-cells $F_r$ have a single input excitatory region of a few synapses, combined additively with the standard e-cell pair interconnections. Stage r backward e-cells are extended by $p_b$ input regions of two synapses each. The dcf of $F_r$ combines the $p_r$ regions additively. In FIG. 1, only one of the two synapses per region is shown connected. The use of the second synapse will be described later.

Stage b forward e-cells, $F_b$, are extended to $p_r$ excitatory regions of two synapses each. The dcf of $F_b$ combines the $p_r$ regions additively. In FIG. 1, only one of the two synapses per region is shown connected. The use of the second synapse will be described later.

The cmf for the forward path from group r to group b maps the i-th e-cell of the j-th $F_r$ cluster to the j-th region of the i-th e-cell of each $F_b$ cluster (where i=1 . . . $q_b$, j=1 . . . $p_r$) 202, 204.

The cmf for the backward path from group b to group r maps the i-th e-cell of the j-th $B_b$ cluster to the j-th region of the i-th e-cell of each $B_r$ cluster (where i=1 ... $q_b$, j=1 ... $p_b$) 203, 205.

The weight of the $F_r \rightarrow B_r$ standard connection is made insufficient to allow oscillation of stage r on its own.

Behavior of the r-b-m Circuit

The dynamics of the r-b-m circuit are those of the standard 3-stage totem. Stage m supplies the strong forward to backward excitation that completes the oscillator when one or more of its forward e-cells receives activation in a pattern corresponding to its learned synaptic weights.

The set of features that were considered to have activated a given cluster in stage b in the discussions of the basic memory circuit, now activate a cluster in stage r of the r-b-m circuit. The input field $I_r$ consists of $p_r$ such sets. Suppose a subfield of $I_r$, $I_r^s$ consists of s adjacent clusters activated by a pattern of features identical with percept memorized in some e-cell $F_m^k$. For the moment suppose that no other part of the input field other than $I_r^s$ has any activation. Each activated cluster infrwill apply its input pattern to all $F_b$ clusters. At least $F_m^k$ is delivered the inputs necessary to make it respond, but so may a good number of other $F_m$ e-cells which happen to have been trained with various permutations of the current input pattern. And these permutations are not just cluster re-orderings, but all the possible exchanges of the i-th input within each cluster. The result could be incorrect percepts responding along with the correct one.

Confusion Sets and Their Rejection

The absence of cluster ordering also means that any signal that evokes a permutation of the features of $F_m^k$ will be mistaken for the percept memorized in $F_m^k$ the set of all such permutations will be termed the confusion set of $F_m^k$. Several variants of modification may be added to the base r-b-m e-circuits to make them capable of rejecting the confusion sets of learned percepts.

R-match

The goal of this circuit addition is to allow any pattern in a cluster to be used as a code without risk of impersonation by cross-cluster inputs to stage r. The class of circuits that accomplish this reduction of the confusion set take advantage of the fact that the stage b backward paths carry an exact image of the trained pattern of the responding $F_m^k$, and that pattern can be used to eliminate all but valid $F_r$ clusters.

A critical step must be taken to implement any of the solutions: gating between $F_r$ and $F_b$ must be arranged so that either an entire cluster is coupled or none of it is coupled. There are a number of equivalent circuits to accomplish this, but one of the simplest uses the second synapse of each $F_b$ and $B_r$ region as an inhibitory synapse paired with the synapse from $F_r$ and $B_b$ respectively.

Figure 2:
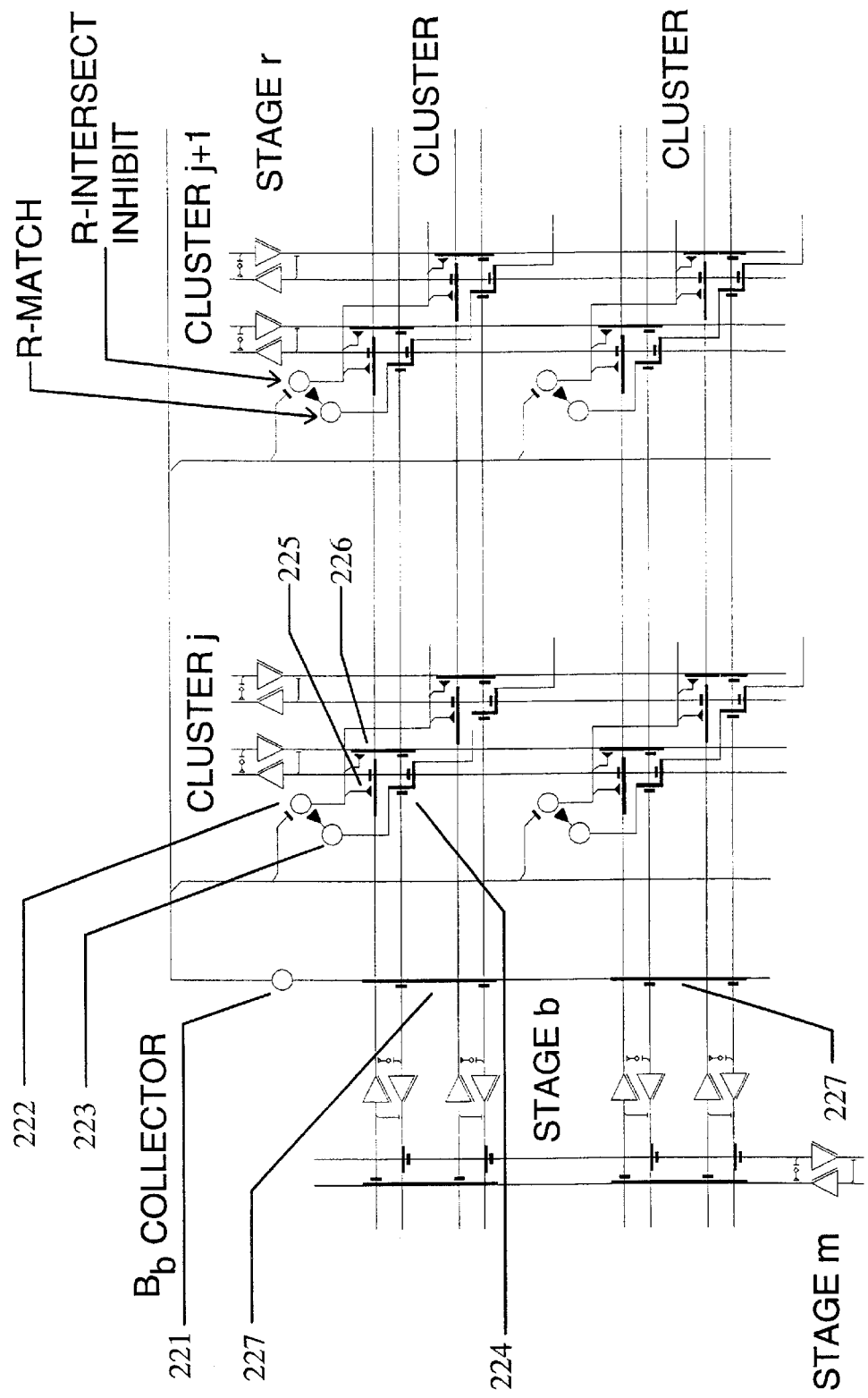
FIG. 2 shows r-match e-circuitry applied to stages r and b of an r-b-m e-circuit. This e-circuit uses an inhibitory r-intersect connection to r and b.

FIG. 2 illustrates the basic r-b-m circuit with r-match using an inhibitory connection from r-intersect to stage b forward and stage r backward.

The necessary matching requires circuitry that compares the activity of corresponding $F_r$ and $B_b$ e-cells within the intersection of stage r and stage b clusters. Each r-match e-cell 223 has $q_b$ regions of two excitatory synapses each 224. Each region has an input from the corresponding $F_r$ and $B_b$. Each r-match region has a threshold that requires both inputs to the region to be active in order for that region to contribute to the additive dcf. The dcf thresholds at a level which requires a sufficient number of active regions, and any number of matches above this level simply causes that r-match e-cell to respond more strongly.

Each r-match e-cell is connected by an inhibitory synapse to a corresponding r-intersect-inhibit e-cell 222. If the r-match e-cell is active due to a match in its cluster intersection, it inhibits the activity of its corresponding r-intersect-inhibit e-cell 222. The r-intersect-inhibit e-cell 222 has an inhibitory synapse on each of the regions of $F_b$ 225 and $B_r$ 226 within its cluster intersection. During recognition all r-intersect-inhibit e-cells are activated by the signal coming from Bb collector 221 except those at intersections where the associated r-match e-cell 223 is active and inhibits the excitation coming from $B_b$, collector 221. Thus the transfer of activation $F_r \rightarrow F_b$ and $B_b \rightarrow B_r$ only takes place at intersections where there is a match detected by r-match e-cell. This accomplishes the desired gating behavior.

Obviously the r-intersect-inhibit e-cells must all start out quiet when a new input field is first applied in order since there is no $B_b$ pattern yet to match, otherwise no activity would be transferred onto the stage b forward path. Since there is no activity on stage b backward e-cells until stage m responds, all the r-intersect-inhibit e-cells start out inactive. But when $B_b$ becomes active due to some response from stage m, the excitatory connections 227 activate $B_b$ collector 221 which then activates all r-intersect-inhibit e-cells except those inhibited by signal from the associated r-match.

Excitatory R-match

Figure 6:
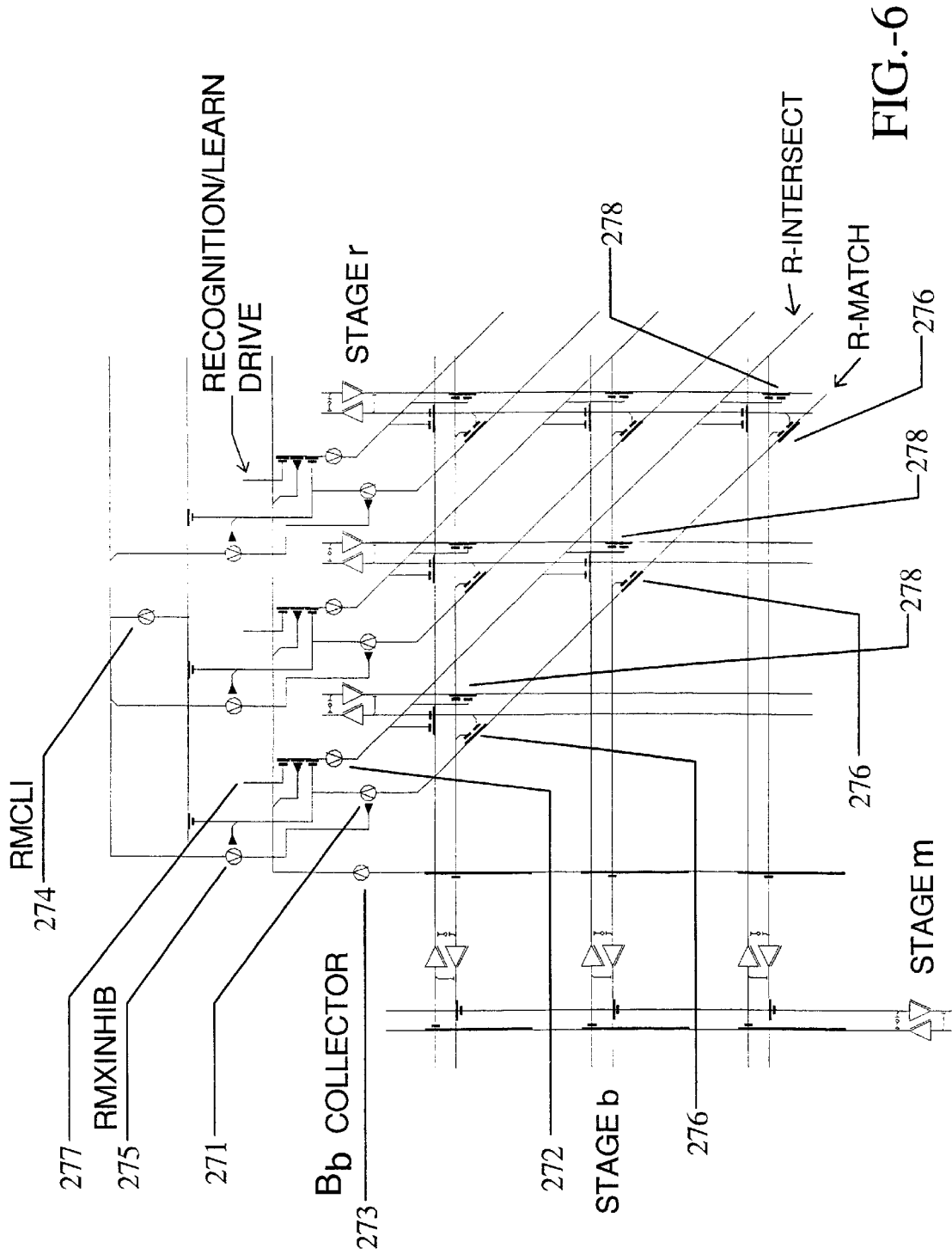
FIG. 6 shows long diagonal r-match diagonalization e-circuitry applied to an r-b-m e-circuit. This e-circuit also uses excitatory r-intersect to r and b. The long diagonal e-circuit activates the entire length of the diagonal with a single r-intersect e-cell. The choice of inhibitory or excitatory r-intersect to stage r-b connections is independent of the choice of single or multiple r-intersect e-cells to activate the diagonal. The figure also shows a lateral inhibition extension to the circuit, which implement competition between the r-match e-cells and inhibits all but the one with the highest output.

FIG. 6 illustrates an alternative implementation of r-match which uses an excitatory connection between the r-intersect e-cell 272 and the stage b forward and stage r backward c-cells. In this arrangement the target regions on $F_b$ and $B_r$ 278 have thresholds which require activity of both inputs in order to exceed threshold in order for that region to contribute. A tonic (sustained) signal 275 activates the r-intersect e-cell, but is inhibited by the signal from bus-backward collector e-cell 273. This tonic signal allows the first burst of activity from stage r to be gated onto stage b before the backward activity on stage b activates both r-match e-cell 271 and bus-backward collector 273. The r-match e-cell 271 has an excitatory synapse to its associated r-intersect e-cell 272, because in this circuit a match detected by the r-match e-cell needs to activate the gating of $F_r \rightarrow F_b$ and $B_b \rightarrow B_r$.

Functionally the excitatory r-intersect e-circuit and the inhibitory r-intersect e-circuit described in the earlier section are equivalent.

The arrangement of the r-match e-circuit shown in FIG. 6 uses a single r-match e-cell and a single r-intersect e-cell to service and control many stage r—stage b intersections and is called long diagonal. The circuit illustrated also includes auxiliary e-cells which implement lateral inhibition between r-match e-cells. The function and applications of these features are discussed below. (The choice of excitatory or inhibitory r-intersect e-circuitry is independent of choice of using multiple or single r-intersect e-cells.)

R-match Dynamics

The dynamics of all of the match based circuits are similar, though the first described will be used as the specific example. On the presentation of a novel field the circuit behaves like the r-b-m circuit. The evoked responses from stage m may be from signals corresponding to one or more percepts as well as signals corresponding to the confusion sets of these or other memorized percepts. Many or all of the stage b forward and backward paths become massively active until general

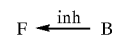

inhibition from the standard e-cell pair inhibition from backward to forward paths shuts down all the forward signals. The slower build-up of inhibition via the $B_b$ collector circuit prevents the r-intersect-inhibit e-cells from having any effect on this first forward pulse. The r-match circuits, however, with faster rise-times, have used the first backward pulse to sort out which of the $F_r$ and $B_b$ clusters have matched signal patterns. R-match e-cells have a long decay so that the next signal from $B_b$ collector will be blocked at the r-intersect-inhibit e-cell for those clusters with good matches. The r-intersect-inhibit e-cell sustains its inhibition long enough to block the next cycle, and that inhibition is renewed on every burst of activity anywhere on $B_b$. Generally by the second cycle the forward signal from $F_r$ meets a well established differentiation in conduction into $F_b$ for clusters with good matches versus those with poor matches, so the forward and backward activity on stage b is dramatically pruned compared to the first pulse.

Periodicity Competition

Generally by the second cycle responses of stage m are limited to those which have all their regions matched by an input cluster. If there are multiple input patterns evoking responses from several responding stage m e-cells at this stage, the differences in strength of response show up as different periodicities for the different respondents. Because $B_b$ collector integrates the entire backwards $B_b$ path, the inhibitory effect of the earliest of the backward travelling pulses is felt first across the forward path, except where blocked by the earliest arriving r-match signals. Later arriving r-match signals increasingly fail to block the inhibition, so any respondents with longer period oscillations than the fastest respondent are suppressed over the next few cycles.

Figure 3:
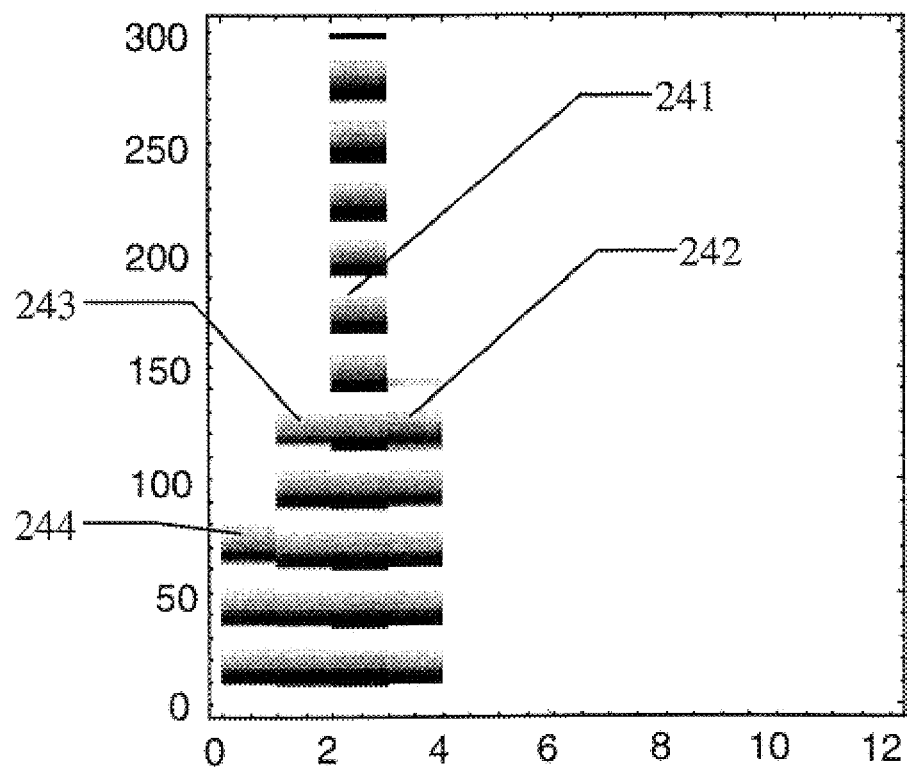
FIG. 3 shows a density plot of stage m response to two input pattern competitors nearly equal in strength presented concurrently. The lag in response to the weaker competitors, and to spurious combinations leaves the stage m e-cell corresponding to the stronger competitor as the sole survivor. The conditions of this test are specially chosen to prolong the competition to make the process of periodicity competition apparent.

It is important to recognize that an important side effect, illustrated in FIG. 3, has been introduced with the r-match circuit: the time difference between the general inhibition due to $B_b$ collector and the path-specific enabling due to r-match implements a periodicity-based completion to establish winner-take-all among stage m respondents of different strengths. This eliminates the need for massive, usually prohibitive, lateral inhibition connectivity across the very large populations of stage m memory e-cells. All the variants of r-match circuitry have this behavior in common. In r-intersect variants which control gating with excitatory synapses, the decay of excitation by those r-intersect e-cells which lack r-match excitation performs the same function as the rise of inhibition from r-intersects which gate with inhibitory synapses. The differentiating effect is a bit slower in the excitatory version since it acts off the shallower slope of the decay than the initial rise. In practice it takes a cycle or two more to single out a winner when there are close competitors.

The test conditions used to generate FIG. 3 were designed to prolong the competition to more clearly illustrate spurious responses of stage m percepts before r-match takes full effect. FIG. 3 shows two spurious responses 244 and 243, and a response to a weaker input pattern 242, dropping out in succession due to r-match induced periodicity competition leaving only the correct percept 241 responding. In real e-circuits the sorting out process usually takes two cycles or three at most.

Diagonalization

The term diagonalization derives from its kinship with the diagonal matrix, and its objective is to dynamically enforce a strict ordering on the mapping of $F_r$ clusters to $F_b$ clusters. To eliminate cluster anagrams from the confusion set during recognition the ordering of the subset of $F_r$ clusters gated onto $F_b$ must be the same as when the percept was originally memorized. The gated subset need not be contiguous in the $F_r$ field. How much non-contiguity is allowed depends on the sensory mode: temporal modes must allow only for skips due to misregistration, while higher dimensional modes like vision necessarily encode sparsely in the $F_r$ field. Since diagonalization only orders a selected subset of the $F_r$ field the density of the subset does not matter.

FIG. 4 is a block diagram of an r-b-m e-circuit illustrating how signals between stage r and stage m must be enabled only along a diagonal. The diagonal will need to be contiguous 253, as in the upper illustration where the input signal 251 is contiguous. The diagonal may need to be scattered or non-contiguous 256, 257, and 258, as in the lower illustration, where the input pattern 254 is non-contiguous.

Diagonalization During Learning

The diagonalization principle is used during recognition to eliminate the confusion set of a memorized percept, but it can also eliminate the need for the direct input of the feature field to stage b to singularize it for learning. By externally activating a single diagonal an extent of stage r as wide as stage b is mapped by that diagonal onto stage b. An input on the mapped extent of stage r can used to unambiguously train stage m.

R-match Diagonalization

Figure 5:
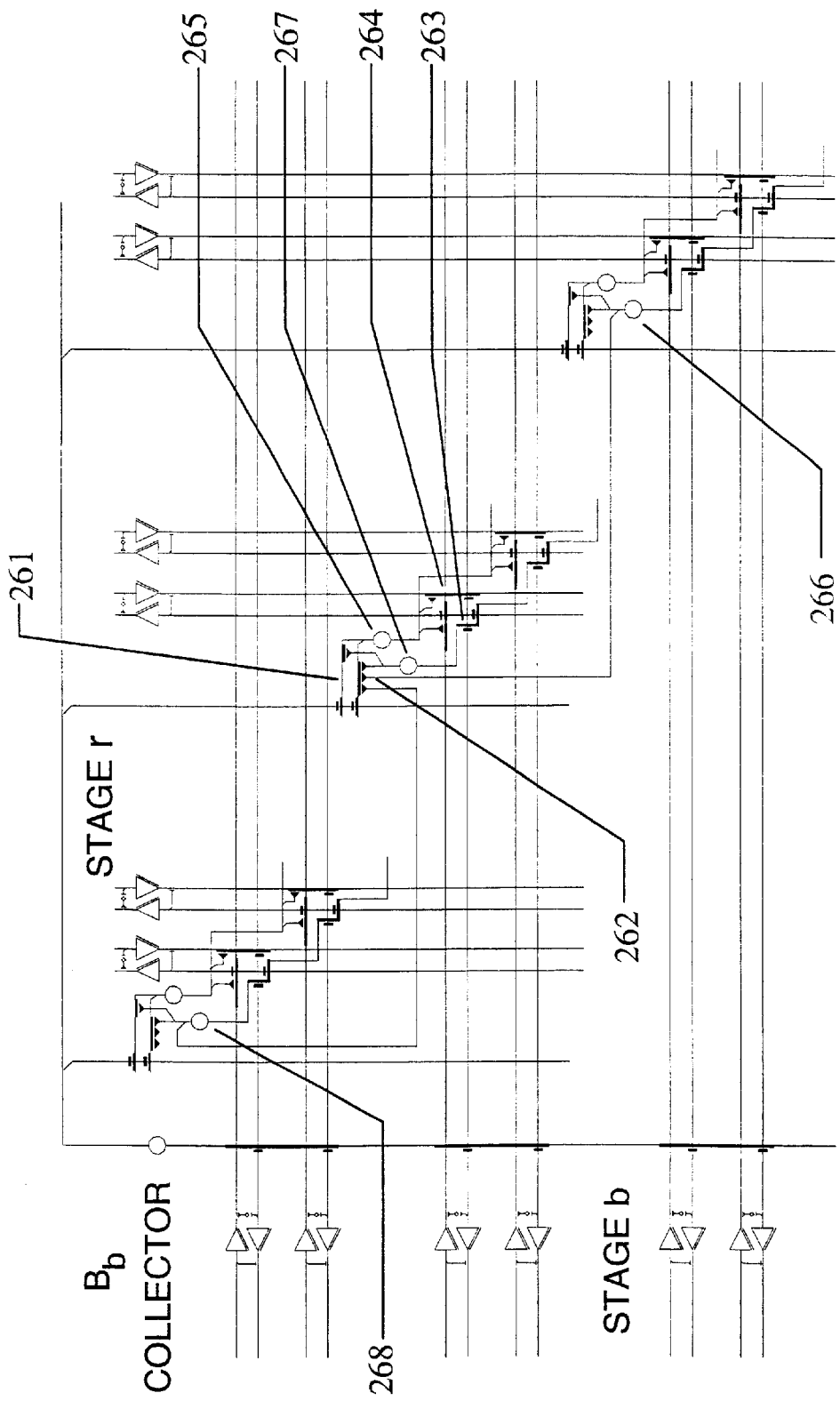
FIG. 5 shows r-match diagonalization e-circuitry applied to an r-b-m e-circuit. For clarity, only a diagonal of length three for a single intersection is shown, and the r-b-m circuitry is rendered in light lines. This e-circuit uses a separate r-intersect e-cell to control the intersection of each cluster, so that multiple r-intersect e-cells must be active to activate a full diagonal.

The mechanisms of r-match and diagonalization can be tersely combined to require an r-match circuit to accept matches only on the diagonal. The modification requires only a minor extension of the regular r-match circuit. FIG. 5 illustrates the modifications to r-match (for clarity, only a single diagonal sampling of length 3 is shown, and the circuitry of stages r and b are shown with light lines). A new branch 262 is added to the existing 261 dendritic structure of the r-intersect-inhibit e-cell. The new branch has an excitatory synapse from $B_b$ collector distal to multiple inhibitory synapses from r-match e-cells a certain distance (radius) along the diagonal relative to each intersection. The only difference between this branch 262 and the original 261 is that its inhibitory region has multiple r-match inputs instead of a single input. The output of this new branch and the original are combined additively. With this modification both the r-match e-cell 267 belonging to the intersection and a number of r-match e-cells 266 and 268 along the diagonal through the intersection must be active to block the inhibition of the r-intersect-inhibit e-cell controlling the intersection. The required length of the active diagonal is determined by the radius of sampling of r-match e-cells and the weights in the inhibitory region. The weights can be constant over the radius or diminish with increasing radius. If the diagonal sampling radius (or effective radius due to synapse weight gradient) is a fraction of the cluster count of stage b, the circuit can diagonalize sparse input fields, as illustrated earlier in FIG. 4.

Long Diagonalization Using R-match

FIG. 6 illustrates a version of r-match diagonalization which minimizes the number of e-cells required to implement it. Instead of controlling each cluster intersection with a separate r-match e-cell and r-intersection e-cell, long diagonalization controls all the intersections along a diagonal (mapping to the full width of stage b) with a single r-match e-cell and single r-intersect e-cell. The r-match e-cell samples $F_r$ and $B_b$ for matches 276's across the full extent of its diagonal. Similarly the r-intersect e-cell control the gating of $F_r \rightarrow F_b$ and $B_b \rightarrow B_r$ along the full extent of its diagonal. The circuit illustrated in FIG. 6 uses an excitatory connection between the r-intersect e-cell 272 and the stage b forward and stage r backward e-cells. In this arrangement the target regions on $F_b$ and $B_r$ 278 have thresholds which require activity of both inputs in order to exceed threshold in order for that region to contribute. A tonic (sustained) signal 275 activates the r-intersect e-cell, but is inhibited by the signal from bus-backward collector e-cell 273. This tonic signal allows the first burst of activity from stage r to be gated onto stage b before the backward activity on stage b activates both r-match e-cell 271 and bus-backward collector 273. The r-match e-cell 271 has an excitatory synapse to its associated r-intersect e-cell 272, because in this circuit a match detected by the r-match e-cell needs to activate the gating of $F_{r \to} F_b$ and $B_b \to B_r$.

The long diagonalization can be used in an inhibitory configuration as well, with inhibitory synapses from r-intersect to stage b forward and stage r backward. In this configuration r-match inhibits r-intersect, and r-intersect receives excitatory input from $B_b$ collector, as illustrated in the localized r-match circuit in FIG. 2.

In some application it is desirable to suppress multiple diagonals from being active at the same time. A lateral inhibition circuit selects the r-match e-cell with the strongest activation and suppresses all the others. The circuit consists of an additive collector of r-match outputs called rmcli 274. Each r-match e-cell has another e-cell paired with it, rmxinhib 275, which has an excitatory input from rmcli and an inhibitor input from its associated r-match e-cell. The inhibitory input blocks the excitatory input from rmcli. The output of rmxinhib in turn inhibits the associated r-match e-cell.

The lateral inhibition action works as follows. As the r-match e-cells respond they contribute their combined output to rmcli, but also block rmcli's excitation of their associated rmxinhib e-cell. The r-match e-cell with the fastest rising activation is most effective at blocking its own rmxinhib, and thus most effective at blocking its own inhibition by rmxinhib. The differential inhibition of r-matches quickly suppresses the weaker ones as they become progressively less effective at blocking their own inhibition via rmxinhib, ultimately leaving only the strongest one active.

This form of lateral inhibition circuit is generally applicable and can be used to implement a winner-take-all selection of the most strongly activated e-cell among a set. It has been applied to stage m e-cells in circuits in which periodicity competition needs to be speeded up due to very small differences in activation between percepts.

Preferred Embodiment of r-b-m E-Circuit with Long Diagonalization

Figure 14:
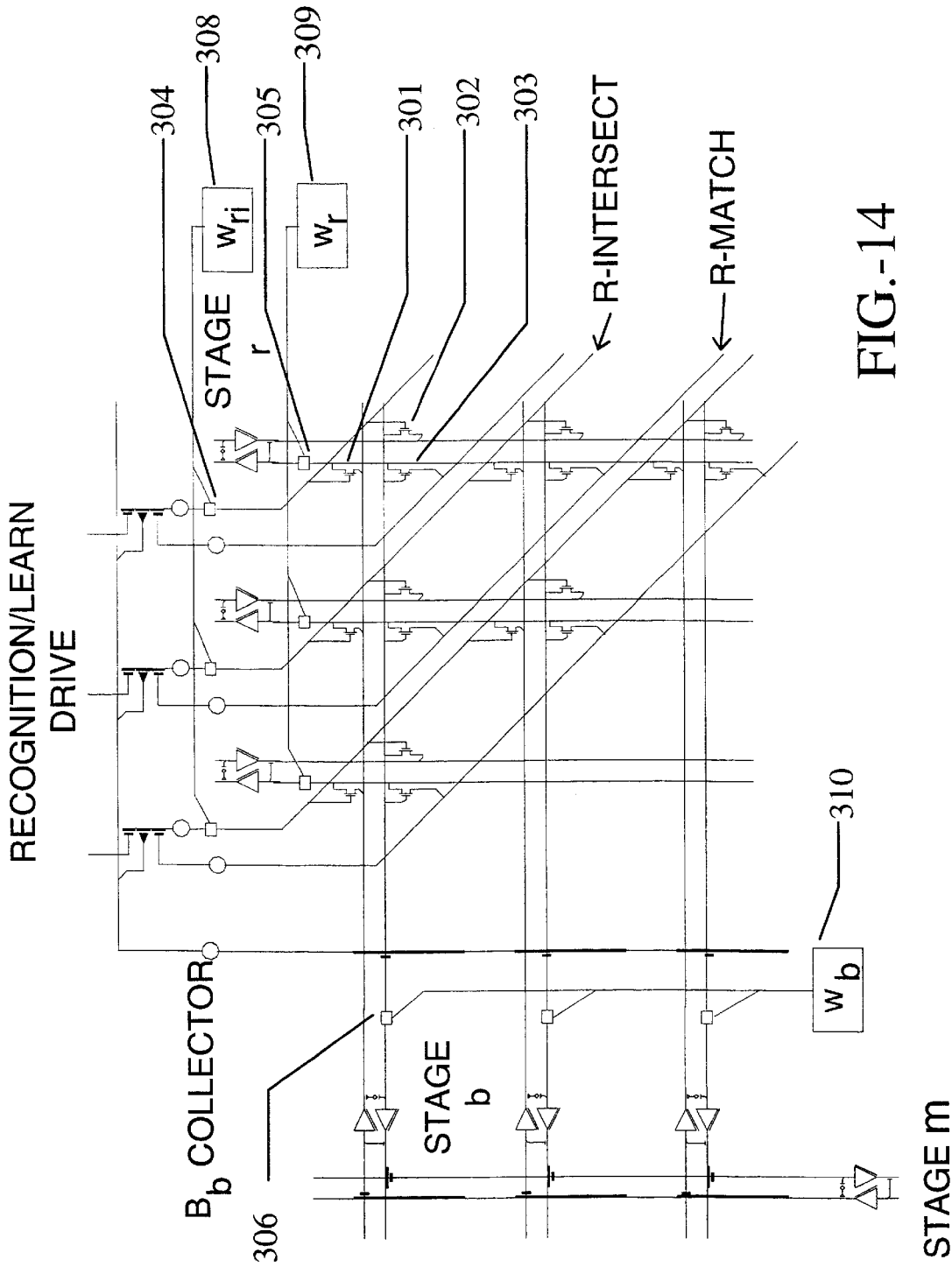
FIG. 14 shows a simplification for the preferred electronic embodiment for r-b-m e-circuits with long diagonalization, using single transistors to implement each synapse pair along the r-match and r-intersect diagonals, and factoring the weight input of the r-intersect synapses to a common weight input to a gain control for each r-intersect, stage r forward and stage b backward, respectively.

The regularity of the r-b-m e-circuit using long diagonalization allows several simplifications in its electronic embodiment, as illustrated in the simplified circuit diagram FIG. 14. All the synapses along each r-intersect diagonal are identical, combined additively and simply implement a gating by r-intersect of stage r forward to stage b forward and stage b backward to stage r backward, respectively. Therefore each synapse pair can be implemented by a single transistor, as shown 301, 302, and the synaptic weight of each synapse of the pair can be "factored" out and implemented by a single gain control for each r-intersect output 304, each stage r forward 305 and each stage b backward 306. The input to the gain control for each of these e-cell populations can be controlled by a single weight input to each: 308, 309, 310. This weight factoring allows either an analog storage of the weight, or a digital storage of the weight with a continuous digital to analog conversion. To distribute the common weight to all of the target gain controls multiple current mirror drivers may be required.

Similarly, each thresholded synapse pair that establish the matches for r-match may also be implemented by a single transistor 303 using the inherent thresholding characteristic of the transistor, or by two transistors if the threshold needs to be externally controlled. The single transistor implementation 303 is shown in FIG. 14.

FIG. 14 illustrates an excitatory version of r-intersect, but an inhibitory version can also be implemented with the same degree of simplification.

Long Diagonals During Learning

The long diagonal implementation lends itself perfectly to singularizing input patterns from stage r onto stage b for learning. If a single r-intersect e-cell in FIG. 6 is activated by a signal independent of r-match, an extent of stage r as wide as stage b is mapped by that r-intersect's diagonal onto stage b. Each r-intersect is thus "responsible" for mapping a particular extent of stage r, so the presence of an input signal in a particular extent can be used to activate its r-intersect's diagonal for the purposes of allowing that input signal to be singularized to stage b and then captured in stage m. Since the bus-backward collector e-cell is not active when there is a novel signal (and therefore there is no recognition) the same input 275 to r-intersect e-cells can be used to apply the singularizing signal to a sole r-intersect e-cell. Thus in recognition, all the recognition/learn drive inputs 275 are active, while during learning only a single one is active.

R-match Diagonalization Performance

Figure 7:
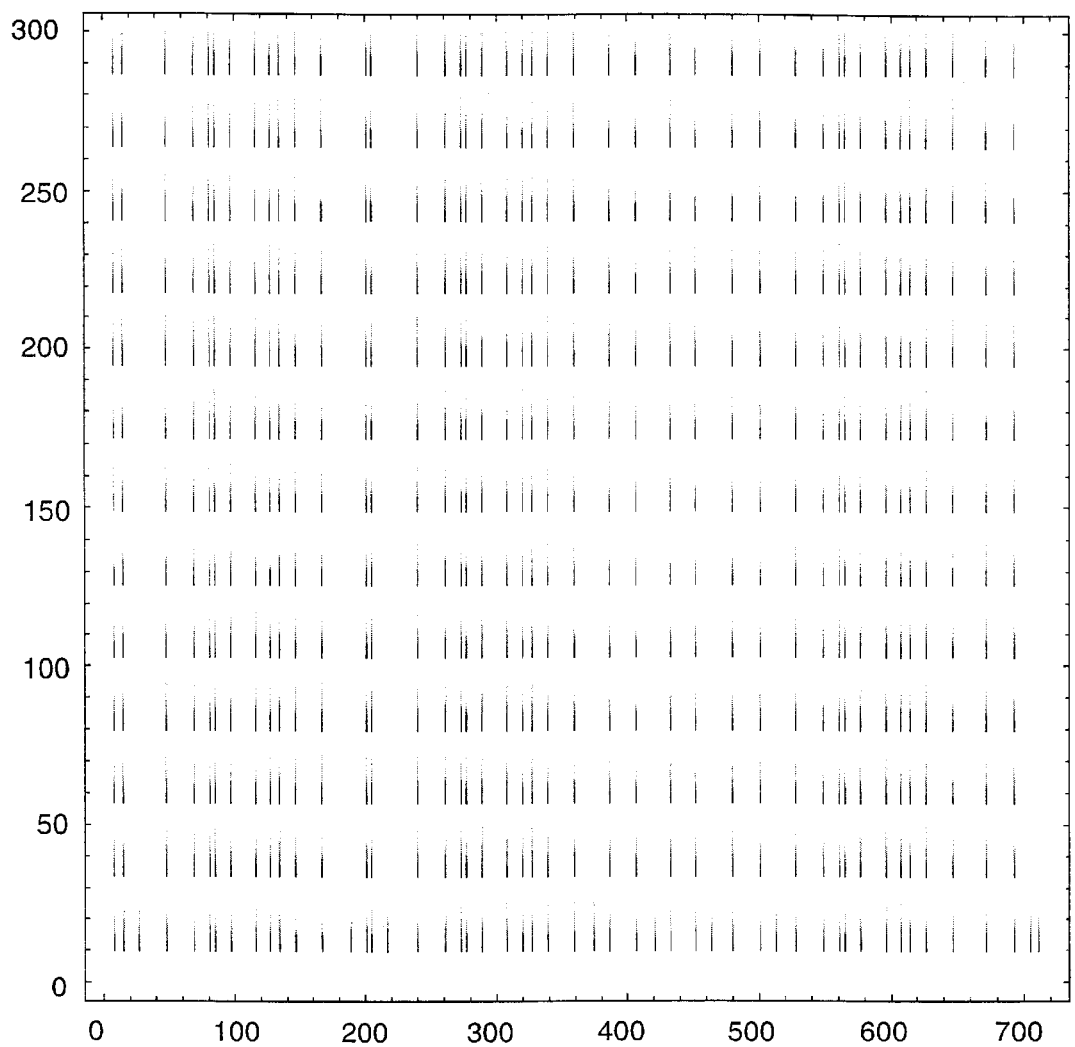
FIG. 7 shows a density plot of the activity of stage r backward e-cells of a r-b-m e-circuit without r-match diagonalization during recognition of a pattern occurring in three locations across the input field embedded in a distractor field background deliberately composed of incidental cluster matches. The pattern of response propagated backward through stage r shows strong response to the distractor background signal.
Figure 8:
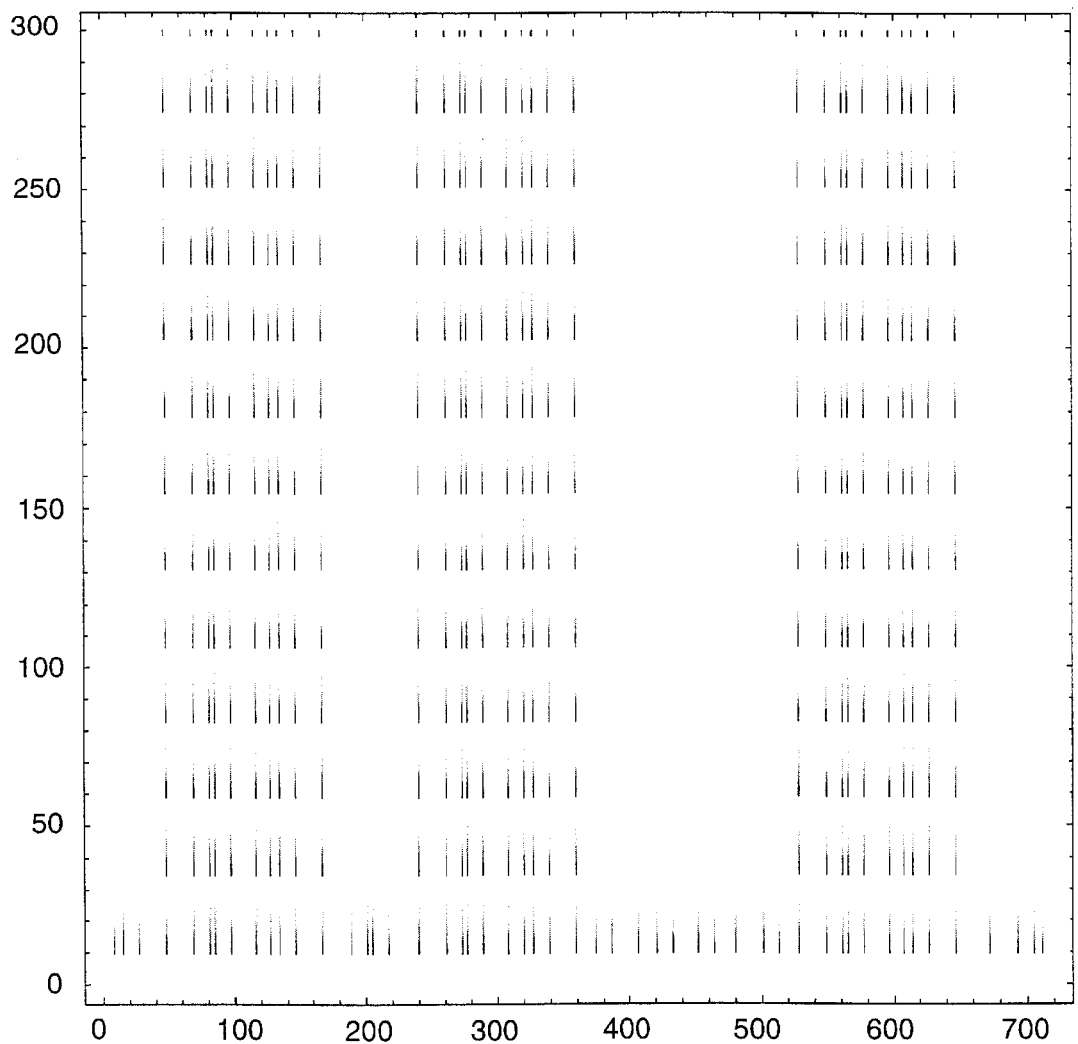
FIG. 8 shows a density plot of the activity of stage r backward e-cells of a r-b-m e-circuit with r-match diagonalization during recognition of a pattern occurring in three locations across the input field embedded in a distractor field background deliberately composed of incidental cluster matches. The pattern of response propagated backward through stage r shows response only to the true signals and none the distractor background.

A test designed to evoke incidental cluster match responses illustrates the behavior of r-match diagonalization. FIG. 7 and FIG. 8 illustrate the difference in discrimination achieved by r-match diagonalization along a radius of $-2$ to $+2$ relative to each intersection. The test signal background is deliberately constructed only of permutations of the 2-x-eme sequences of the target signal. R-match without diagonalizaton (FIG. 7) responds to all of them. R-match with diagonalization (FIG. 8) rejects all the misordered x-eme pairs. The data shows that no extra recognition delay is incurred by the addition of r-match diagonalization.

Using Diagonalization to Implement Compaction

In various applications it is necessary to identify a subset of an already memorized percept and store that subset as a new percept in a compact form. This can be accomplished by using two independent diagonalization circuits: one to map the input signal containing the subset onto the already memorized percept, and another limited radius diagonalization circuit to map the recognized subsets onto a more compact representation. The initial subset recognition makes use of the variable strictness matching capability of the basic memory circuit as described in the associated application E-Cell (Equivalent Cell) and The Basic Circuit Modules of E-Circuits: E-Cell Pair Totem, The Basic Memory Circuit and Association Extension.

Figure 9:
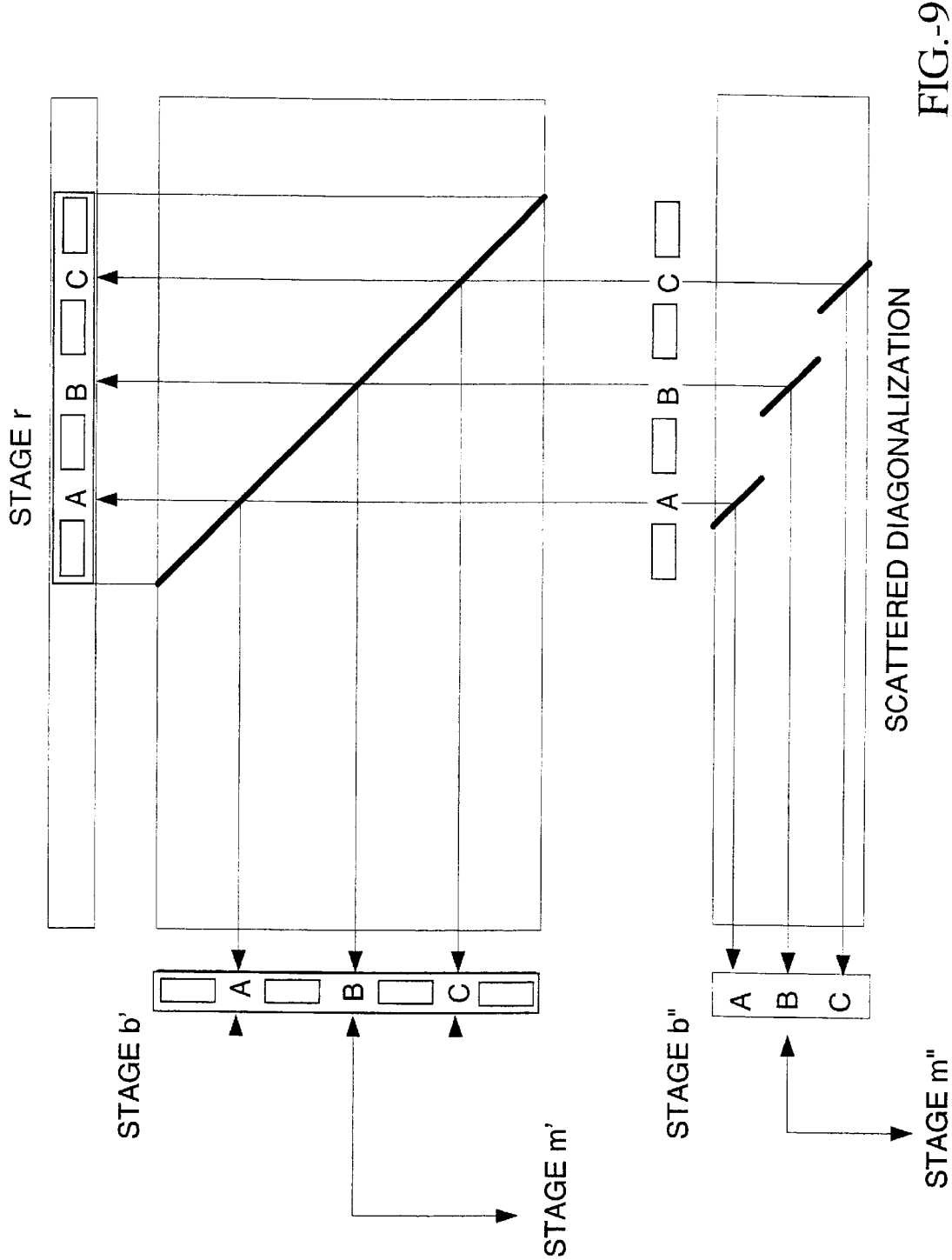
FIG. 9 illustrates compaction of a broken input field using diagonalization.

FIG. 9 is a circuit block diagram showing an extension of the r-b-m e-circuit by addition of a narrower stage b' and stage m' to hold the compacted percept. For simplicity the upper part of the circuit shows a long contiguous diagonal, though this is not necessary. The short radius diagonals of the lower part of the circuit can singularize and compact any scattering of segments of the input signal that will fit into the width of stage b'.

Pattern Repetition

The circuit as enhanced to this point has a very useful response to a field which contains repeated subfields which correspond to a single memorized percept $F_m^k$. Since r-match operates locally, the circuit will find matches for each of the repeated subfields. The forward signals from each corresponding stage r subfield cluster will be gated onto the appropriate stage b cluster, and the backward signal will find its way to the appropriate clusters for each incident subfield. Unless there is extremely powerful competition in stage r focus circuitry all of the subfields will remain active. Even if the excitations of the different subfields are not equal, the response to each is locked to the others, since the aggregate excitation through $F_b$ determines the strength of response of $F_m^k$.

This multiple locus response to repeated patterns in the input field (a) is the means of identifying and locating patterns, (b) gives extra weight to recurring patterns in a field (up to the $F_r$ dcf clipping level).

FIG. 8 shows stage r backward activity when the same pattern is presented in three locations across the input field. The activity of 30 stage r clusters, 24 e-cells per cluster, is shown. The number of active e-cells per pattern (10) is due to multi-x-eme sampling into stage r from a prior stage (t) as described later. It represents five clusters with two active e-cells in each.

From the data it is clear that the backward path provides a signal corresponding to the loci of all the percept occurrences across the input field, and that such repetitions can be identified even in the midst of a highly distracting background. The responding percept does not have to have been captured earlier. If one subfield of a novel pattern is located in the circuit's "learning field", its capture in $F_m^k$ will cause the other instances of the pattern located across the recognition field to be located on the next cycle. If stage m is a short term visual memory the backward path induced focus signals characterize perspective gradients formed by repeated patterns in a visual field, independent of the pattern itself.

Motion Tracking

A corollary of the ability to identify repetitions of patterns is the ability to track the motion of a percept across the input field. The motion may be continuous or in intervals. The natural oscillatory cycle of the e-circuit, combined with quantizing by stage r, makes motion simply a special case of pattern repetition. A moving target causes its input pattern to appear sequentially at a series of locations across the input field and those patterns to disappear from previous locations after an interval dependent on the decay rate of the output from the feature field detectors. The activity of r-match e-cells track the location of the percept across the input field. To permit tracking of targets which move at rates greater than the distance spanned by one stage r e-cell divided by the recognition oscillatory interval, the persistence or decay time of the input feature detector must be longer than the recognition oscillatory interval.

Scene Segmentation: Attention Focus Circuitry

Figure 10:
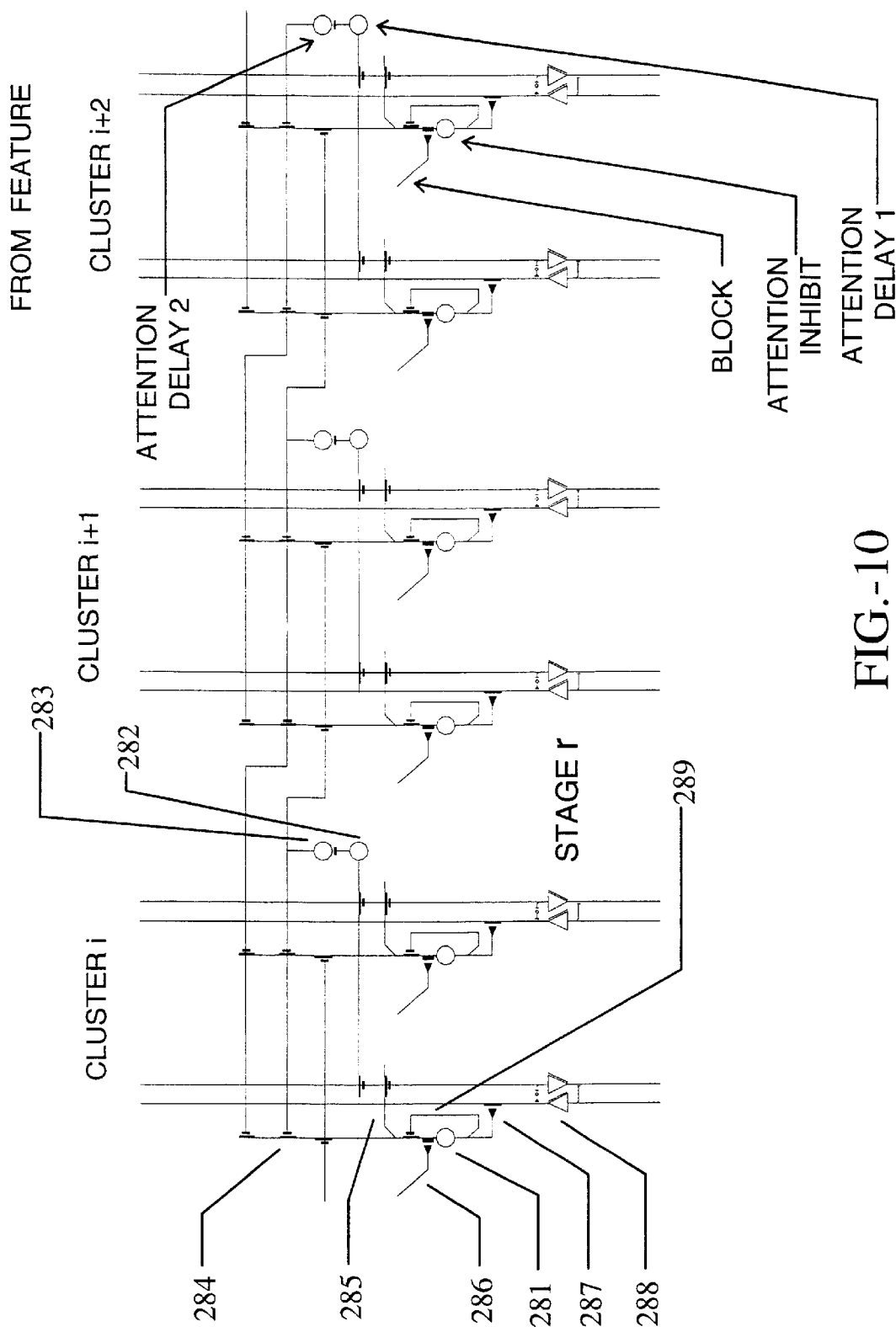
FIG. 10 shows attention shift e-circuitry as applied to stage r. This circuitry uses recognition signals propagated on stage r backward path to inhibit recognizes subfields of the full input field and allow other percepts present in the input field to be recognized in turn.

A circuit extension of stage r causes matched intervals of the input scene to be silenced as they are matched. FIG. 10 illustrates circuitry which implements successive focus shifts after recognition of a subfield of the input. The attention-delay 1 e-cell 282 receives input from the stage r backward e-cells of an entire cluster. attention delay 1 e-cell 282 is a slow integrator whose output reaches a level sufficient to overcome the input region threshold of the attention-delay 2 e-cell 283 only after a number of active backward path cycles $B_r$. The attention-inhibit e-cell 281 receives excitatory input 284 from the attention delay 2 e-cells 283 of a number of adjacent clusters, and when sufficient number of these inputs are active the attention-inhibit e-cell 281 in turn inhibits the input of it associated stage r forward e-cell 288 via an inhibitory synapse 287. The attention-inhibit e-cell 281 has a self-exciting connection 289, so that once it receives sufficient input it continues to inhibit its associated $F_r$ 288 even after the inputs have been suppressed by lack of a backward signal. Its inhibition is terminated by a blocking signal from some other source on the proximal inhibitory input 286.

The circuit is initially inactive when the input field is applied to stage r, for example. The attention delay 1 e-cell 282 ramp up time is long enough to allow the strongest recognized subfield to capture the active forward and backward paths (as a result of r-match activity.) Once the attention-inhibit e-cells 281 for the active paths fire, the inputs via $F_r$288 are suppressed and thus allow the next most active subfield to capture the active paths. This, too, in turn suppresses itself so that a third, fourth, etc, subfield can capture the active paths in turn. Should the inhibition by attention-inhibit 281 be terminated while the input field is still active, then the $F_r$ e-cells 288 carrying the original strongest subfield will be active again and will capture the active paths as soon as the r-match circuits let go of the current winner. The stage-r backward e-cells provide an indication of location within the input field and the extent of the matching pattern.

Figure 11:
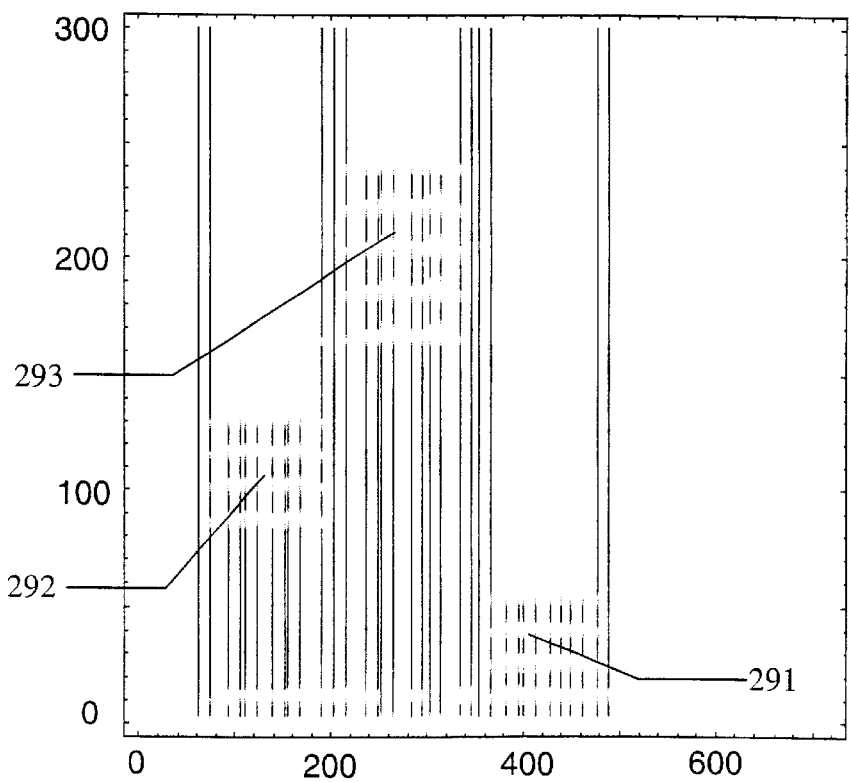
FIG. 11 shows a density plot of the activity of stage r backward e-cells of an r-b-m e-circuit with attention shift e-circuitry during attention shift and input field segmentation of a three subfield input without distractors.

FIG. 11 shows the activity of stage r forward e-cells during three attention shifts. In the test signal the "golabu" subfield and "bidaku" subfield have progressively less activation than the "tupiro" subfield. After one cycle the strongest input 291, "tupiro", is the recognition winner, but it is suppressed after approximately 100 t, allowing the as-yet-unmatched "golabu" input 292 and "bidaku" input 293 to be recognized in turn.

Figure 12:
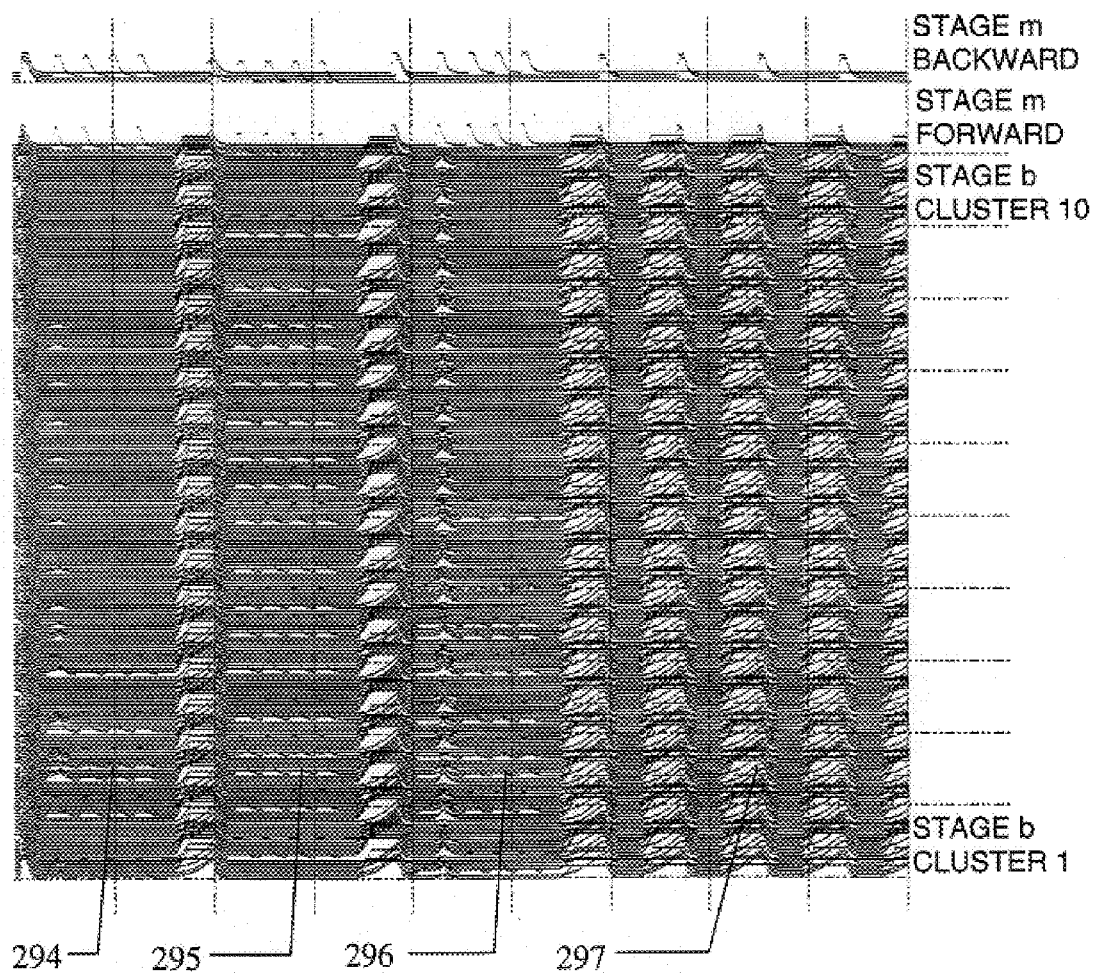
FIG. 12 shows an amplitude plot of the activity of stage m and stage b forward e-cells of an r-b-m e-circuit with attention shift and r-match diagonalization e-circuitry during attention shift and input field segmentation of a three subfield input with partially matching distractors. The three actual percepts are recognized in turn as indicated by the selective higher frequency responses, while the remaining distractors in the background result in nonselective, low frequency "non-recognition" responses after the percepts have been picked out.

FIG. 12 shows the amplitude response of stage m forward and backward e-cells and of stage b forward e-cells during a series of three attention shifts. The input field in this test consists of three target patterns embedded in a background of distractors comprising x-eme pairs from the memorized percepts. The low frequency response 297 after the three successful high frequency recognition intervals 294, 295, 296 is caused by a stage m e-cell responding to a confusion set combination among the background inputs before lack of r-match activity suppresses the spurious response. The low frequency response is too sporadic to invoke any attention focus activity (or any other dependent activity that would constitute recognition).

There are many ways to exploit this behavior to segment a large input field containing many recognizable subfields. The ordering of the focus shift can be influenced by contextual bias on the percept memory cells as well as by the intrinsic strength of the input subfields. Thus if a series of focus shifts sequenced by input activation levels fails to yield a semantically satisfying "parse" of the entire input field, varying patterns of context bias may be applied to percept memory and result in a different segmentation of the same input field.

The subject of scene segmentation strategy is vast, because the tasks it undertakes are so varied. What is important here is that the basic mechanism for scene segmentation is a simple augmentation of the standard e-circuitry.

Figure 13:
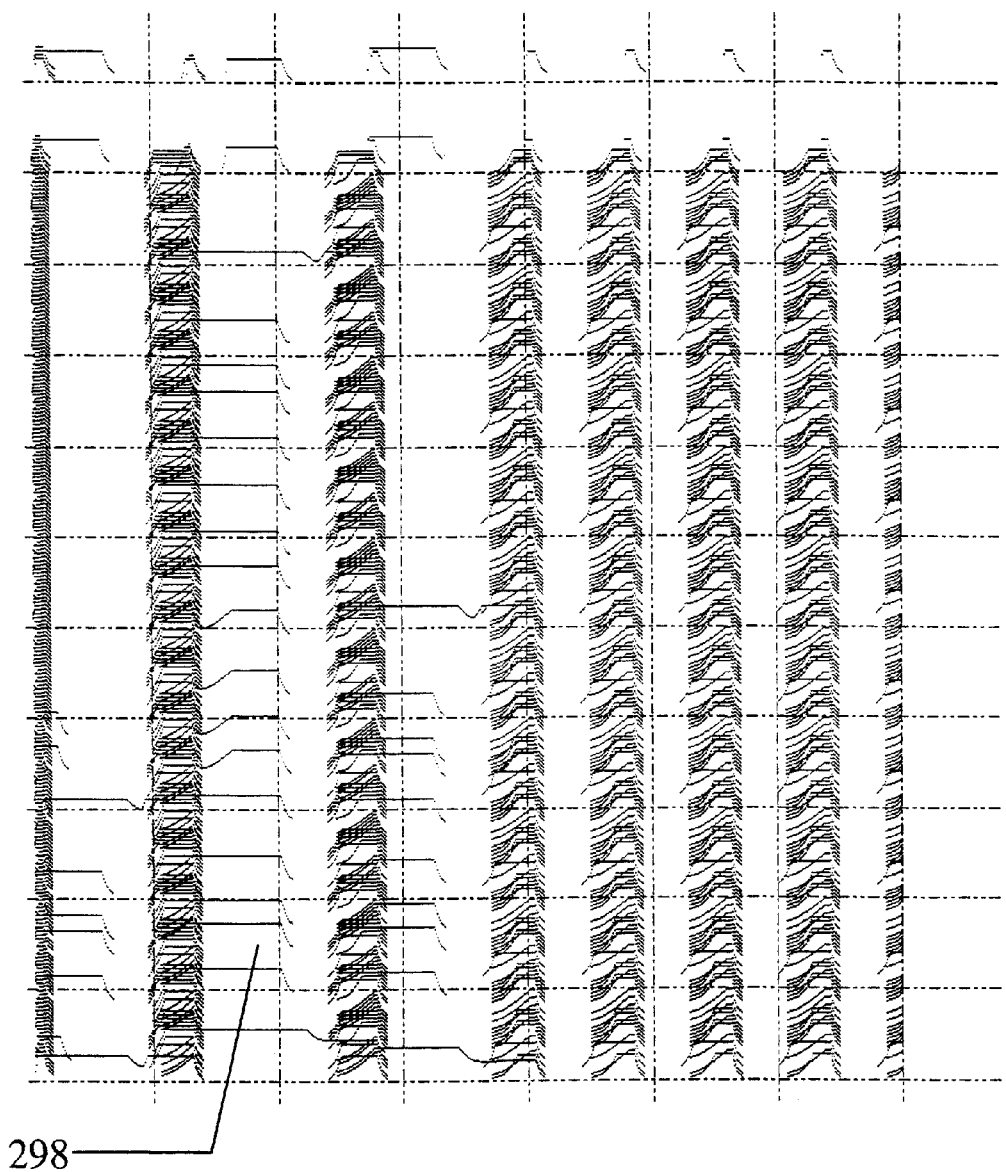
FIG. 13 shows an amplitude plot of the activity of stage m and stage b forward e-cells of a non-oscillatory r-b-m e-circuit with attention shift and r-match diagonalization e-circuitry during attention shift and input field segmentation of a three subfield input with partially matching distractors. The test conditions are the same as for FIG. 12, except all of the inhibitory cross connections between backward and forward e-cells of each e-cell pair have been disabled.

Use of R-match, R-match Diagonalization, Independent Diagonalization and Attention Focus/Segmentation Circuitry in Non-Oscillatory Circuits The operation of r-match, r-match diagonalization and attention focus/segmentation circuitry does not depend on the base circuit having oscillatory dynamics. They function equally well with circuits which maintain a sustained response when an input subfield matches a stored percept. FIG. 13 illustrates the dynamics of the r-b-m e-circuit described earlier modified to eliminate the oscillatory dynamics by zeroing the strength of connection of the inhibitory signal from the backward e-cell to each forward e-cell of each e-cell pair. It can be seen that the response for each subfield recognition is sustained 298 until the attention shift circuitry suppresses it, when the next subfield is allowed to compete for attention.

This applicability of the of r-match, r-match diagonalization, independent diagonalization and attention focus/segmentation circuitry to non-oscillatory as well as oscillatory circuits also means that the stage m e-cell based memory can be replaced with any memory circuit of non-oscillatory dynamics which is capable of inducing the pattern of a responding stored percept on the backward path of stage b, or its equivalent. There are numerous "artificial neural net" type circuits capable of this behavior. It is also possible for oscillatory memory of implementation other than e-cell to be used so long as it is capable of inducing the pattern of a responding stored percept on the backward path.

Non-Oscillatory Modes of E-Cell Circuits

The behavior of the r -b-m e-circuit modified to eliminate oscillatory dynamics, shown in FIG. 13, illustrates that much of the circuit function is independent of the feedback loop inside the standard e-cell pair. Periodicity competition is of course suppressed, but the traces of FIG. 13 clearly show that there is effective competition between the subfields corresponding to three memorized percepts. The competition is based on a rise time race among the responding memory e-cells. If the difference of rise times is sufficiently great, the earliest response suppresses the others by initiating stage b forward inhibition through r-intersect-inhibit before the slower responding memory e-cells reach full output. This is the mechanism that implements periodicity competition as well, but in the non-oscillatory circuit it must take effect on the first rise of the signal, or at latest on the rise of the signal after it meets inhibition via r-intersect inhibit (as is evident in some of the traces of FIG. 13). In contrast, the oscillatory circuit allows the lag of the weaker responders to develop over several cycles, and thus is capable of discriminating smaller differences in response than the non-oscillatory circuit. Oscillatory dynamics also provide a natural synchronization signal to lock the responses of disparate parts of larger circuits. The non-oscillatory circuit, having only a single synchronization point per recognition, is much more delay sensitive. It has other disadvantages such as greater power consumption. For these reasons the oscillatory mode of the e-circuits described are the preferred implementation.

"Wire" E-Cell Bodies

The e-cell pairs used in all stages of the r-b-m e-circuit have standard e-cell body dynamics. Because this standardizes the implementation of the e-cell pairs this is the preferred embodiment. However, this is not necessary to the functioning of the circuit. The bodies of the forward and backward e-cells of stage r at least can have zero rise time and instant decay dynamics: effectively this makes them "wires". In this configuration the excitatory and inhibitory connections between the forward and backward e-cells of the stage r pair and the excitatory connection between the stage t pair may be omitted. However, the slower rise and decay dynamics of stage m are essential to the functioning of periodicity competition, and the delay in stage b is utilized in the implementation of r-match, at least in the preferred embodiment.

Memory (Stage m) Architecture Substitutions

The translation tolerance and segmentation ability of the e-circuits described are applicable to hybrid circuits built with non e-cell implementations of the memory stage (stage m). The only requirement for the memory stage is that it be able to respond to a pattern of activation applied to its inputs via stage b forward e-cells by applying to the corresponding stage b backward e-cells the pattern of memorized percepts. It also must be able to capture such percepts applied from stage b forward. It must also be able to respond within the time constants designed into the rest of the e-circuit if used in an oscillatory mode. However, if the non-oscillatory mode described above is employed then the response time of the substitute memory stage is not critical. If the substitute memory stage has the ability to internally resolve competition between several stored percepts this characteristic does not in any way conflict with the periodicity competition characteristic of the standard circuit. Thus it is possible to use traditional artificial neural nets (ANNs) for the memory stage. This would require however that the training of such an ANN based memory stage by trained in the manner typical for the particular architecture of ANN.

Application to Vision: The Role of Mapping Diagonals

The particular requirement of vision applications of recognition engines or algorithms to accommodate numerous geometric transforms between the input signal and stored percepts makes the r-b-m e-circuit with r-match diagonalization highly suited. The diagonal, as presented earlier was a means of singularing the interconnections between stages r and b. The diagonal in more general terms is a surjective mapping function from stage r to stage b and its inverse. In other words, it is not restricted to being a square matrix diagonal. In its general form it can implement any discrete map between the two stages, and therefore can be used to implement any discretized two dimensional transform from a two dimensional input field or higher degree transform from a higher degree field.

In the machine vision application illustrated here the 2 dimensional transforms of translation, rotation and scaling will be addressed, with some additional indication of the approach to specifying the mappings for other transforms.

Figure 16:
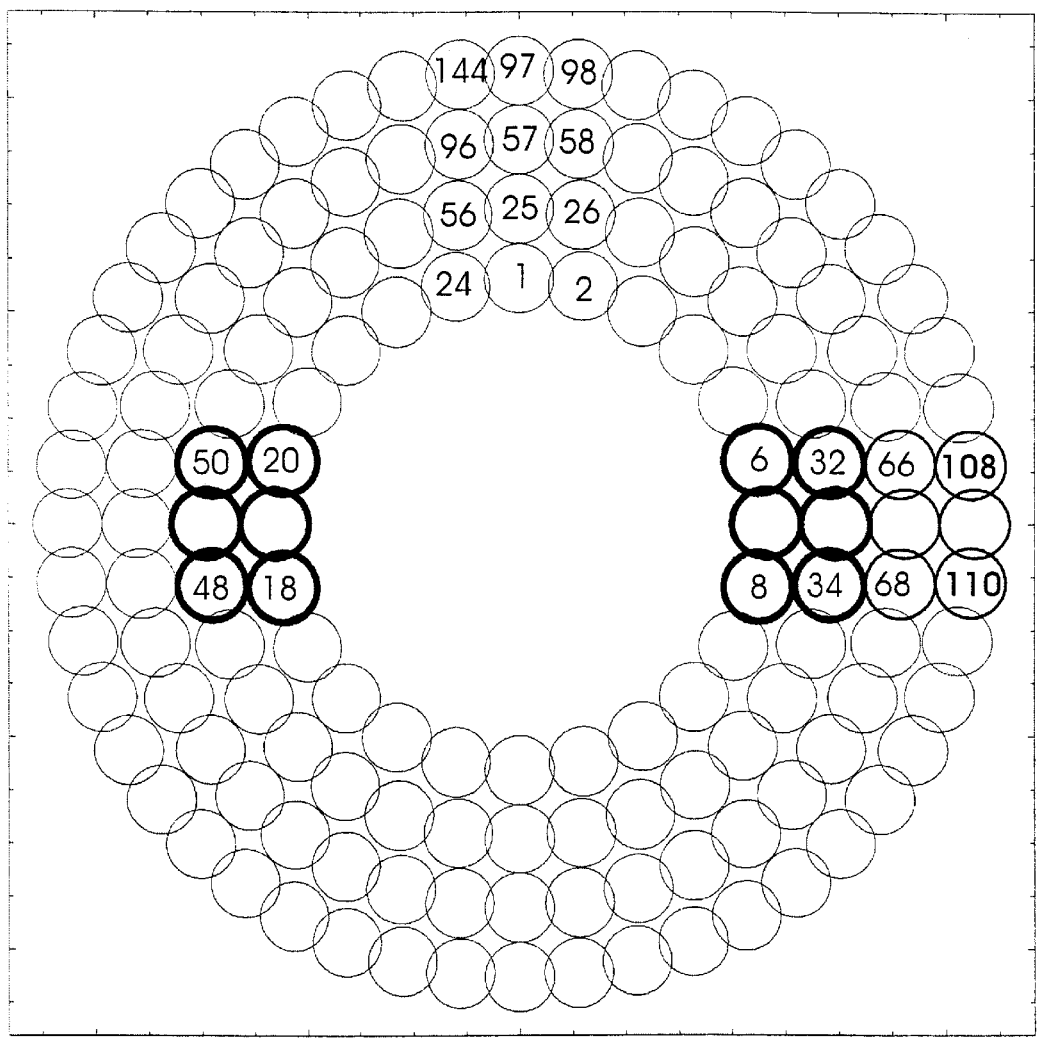
FIG. 16 shows a simplification of the image plane sampling pattern to illustrate the mapping of sampling area inputs to stage r.
Figure 21:
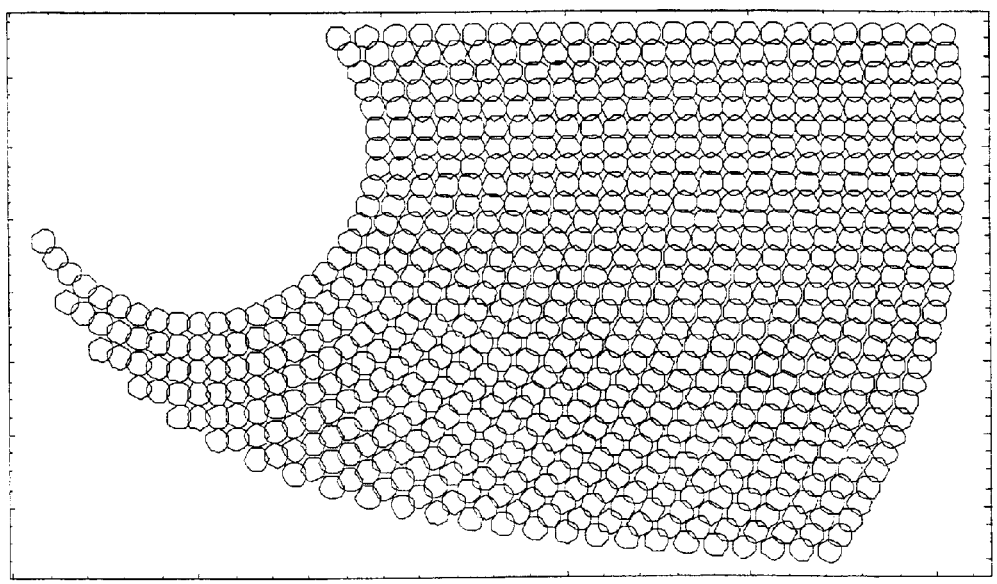
FIG. 21 illustrates the sampling which is used for the tests described in the text. This subset is used simply to reduce the size of stage r and thus reduce the simulation times.
Figure 22:
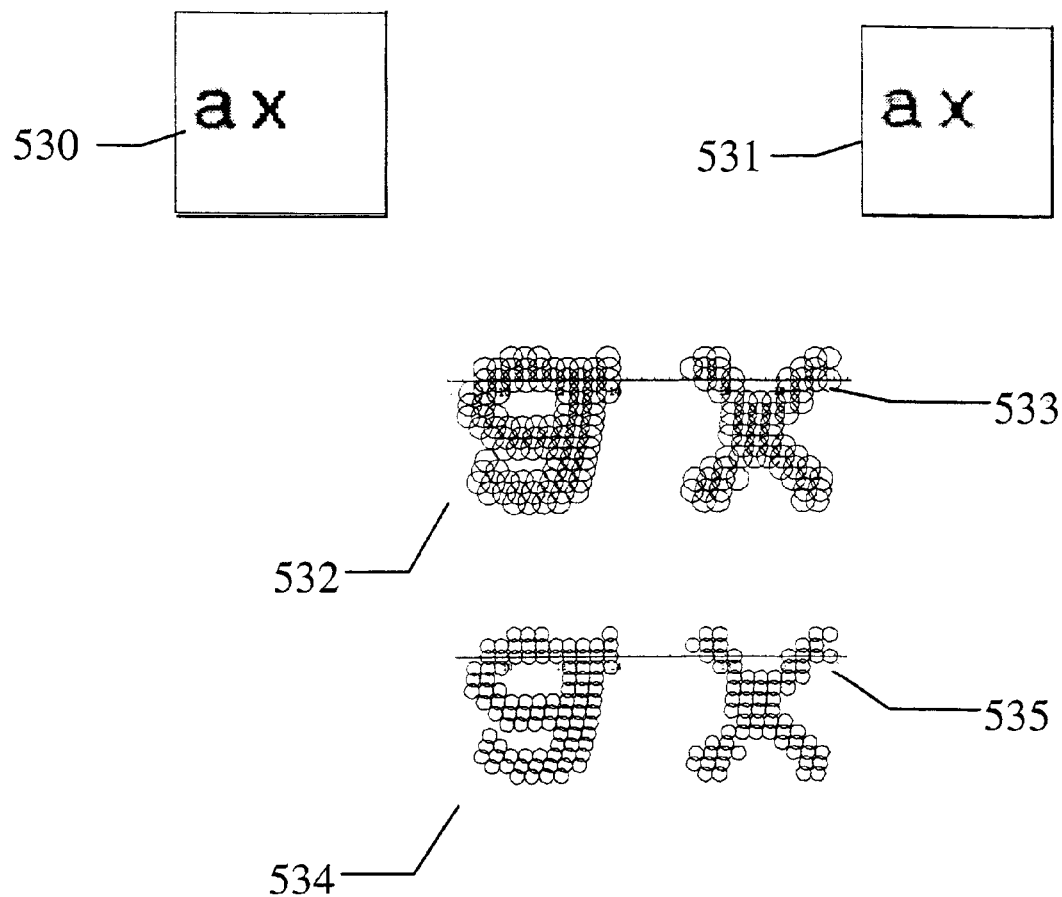
FIG. 22 shows an original image (top left), a filtered version of the original image (top right), the sampling of the filtered image using overlapped fields to reduce vulnerability to aliasing (second row), and that same sampling presented without overlap (third row). For all subsequent sampling pattern fields the non-overlapped version is shown.

The application of the r-b-m e-circuit to image recognition places little restriction on the way or ways an image is characterized. In difficult visual environments multiple characterizations may be required to accomplish the task. In the examples the inputs to stage r are equivalents to the following preprocessing stages: an image pixel array (example FIG. 22: 530) is filtered to create a pixel array that is the equivalent of a "ridge" representation of the illumination of the input line pattern (FIG. 22: 531) which is then sampled by the concentric ring pattern like that shown in FIG. 21 to produce input patterns (FIG. 22: 532–535). Each sample of this pattern is an input to one forward e-cell of stage r, with the contiguous locations on each ring section forming the contiguous inputs along the extent of stage r (illustrated in FIGS. 16 and 17). The ordering of the stage r mappings of the whole sections is chosen to be sequential for convenience, but is actually arbitrary since the diagonals map a coherent image (image in both the visual and mathematical senses) of those stage r inputs onto stage b, and thus to stage m percept memory.

Figure 18:
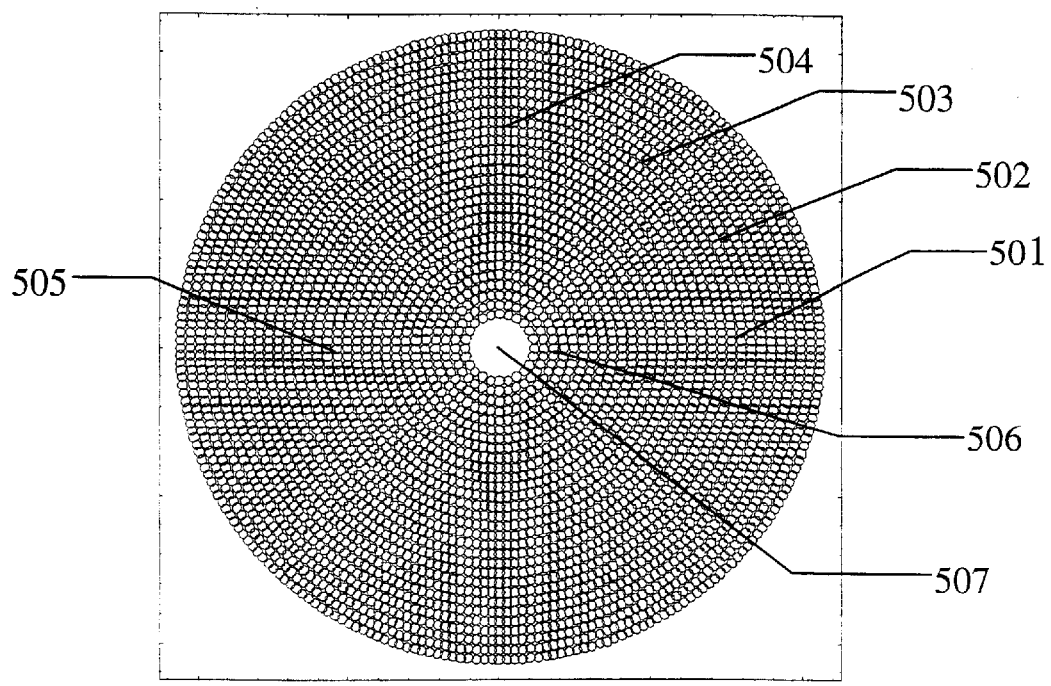
FIG. 18 illustrates the constant size sampling field pattern for a given sample size. This pattern allows translations, rotations, mirrorings and some distortions presented to stage r to be mapped into the normalized percept pattern carried by stage b. Note that in practice the circular sampling fields must overlap to reduce aliasing problems, but for illustration the non-overlapping portions of each field are shown. See FIG. 22 for example of overlapping sampling fields.
Figure 19:
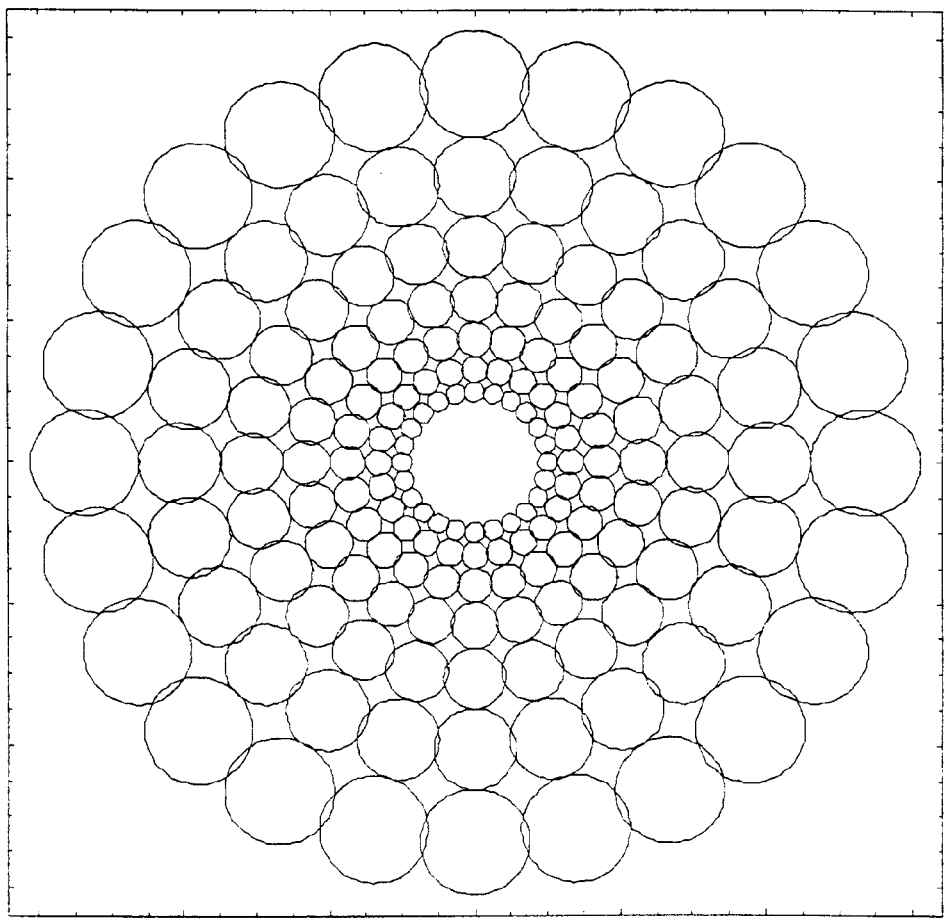
FIG. 19 illustrates a log polar scaling of the sampling field. The field shown in FIG. 18 is repeated at all the scalings shown in FIG. 19. This allows scalings of a percept presented to stage r to be mapped to the normalized percept pattern carried by stage b. Thus each "ring" of sampling patterns shown in FIG. 19 may be considered to be the innermost ring of a sampling pattern which is similar (in its geometric sense) to that shown in FIG. 18. Note that in practice the circular sampling fields must overlap to reduce aliasing problems, but for illustration the non-overlapping portions of each field are shown. See FIG. 22 for example of overlapping sampling fields.
Figure 20:
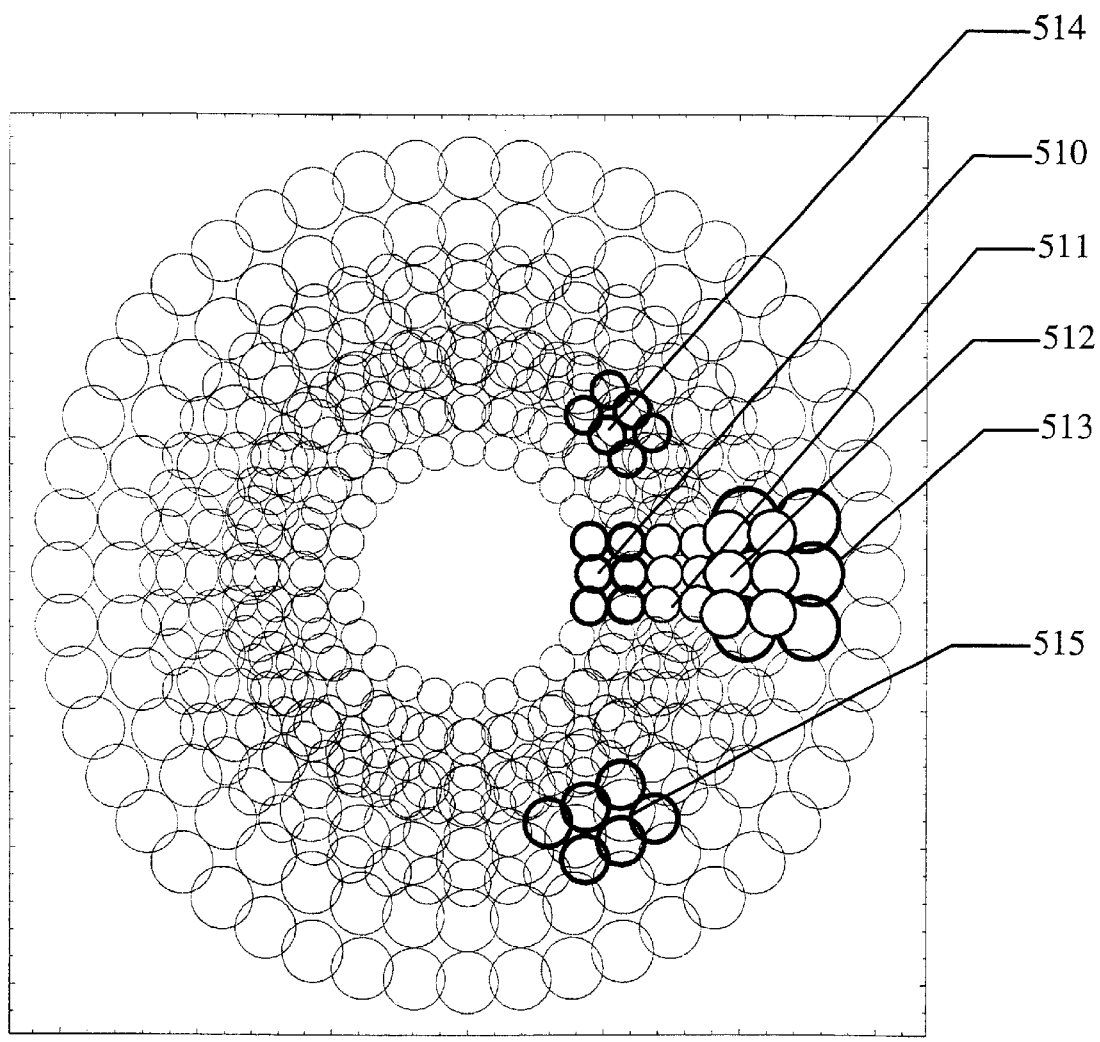
FIG. 20 illustrates a subset of the image sampling pattern described by FIGS. 18 and 19. In this example four "rings" each of three log polar scalings are shown. Marked on this sampling pattern are translations, rotations scalings of the simple 3×2 "rectangular" sampling area discussed in FIG. 17. Each of these has a mapping to the normalized percept pattern carried by stage b, and each mapping is implemented by a single "longdiagonal" as illustrated in FIG. 17.

The concentric pattern of log polar sampling areas illustrated in FIGS. 18, 19 and 20 is chosen because it simplifies the analytic specification of the mapping diagonals required to provide translation, rotation and scaling tolerance (with the limitations discussed later.) However the principle of using diagonals as surjective maps from a sampling space to a percept memory space is fully general, and any input sampling pattern may be used subject to the practical limitations of the aliasing that may result from the discretizing of the input image and the effect of the transforms produced by the mapping diagonals. The preferred embodiment is the concentric pattern illustrated since it requires the lowest density of samples to facilitate the transforms desired.

It should be noted that the connection patterns of the mapping diagonals which implement the stage r to stage b mapping and its inverse can be determined analytically or by training from a much more general set of interconnections. In the interest of conserving circuit resources the preferred embodiment is an analytic specification of the connections, and therefore sampling patterns which facilitate that specification are also preferred. Not all applications of the recognition capability of the r-b-m e-circuit will necessarily require all the transforms described here, and thus sampling patterns other than the log-polar concentric pattern illustrated may provide simpler specification of the necessary mapping diagonals. For example, in an application in which rotation is not required a rectangular array may be more suitable.

Figure 15:
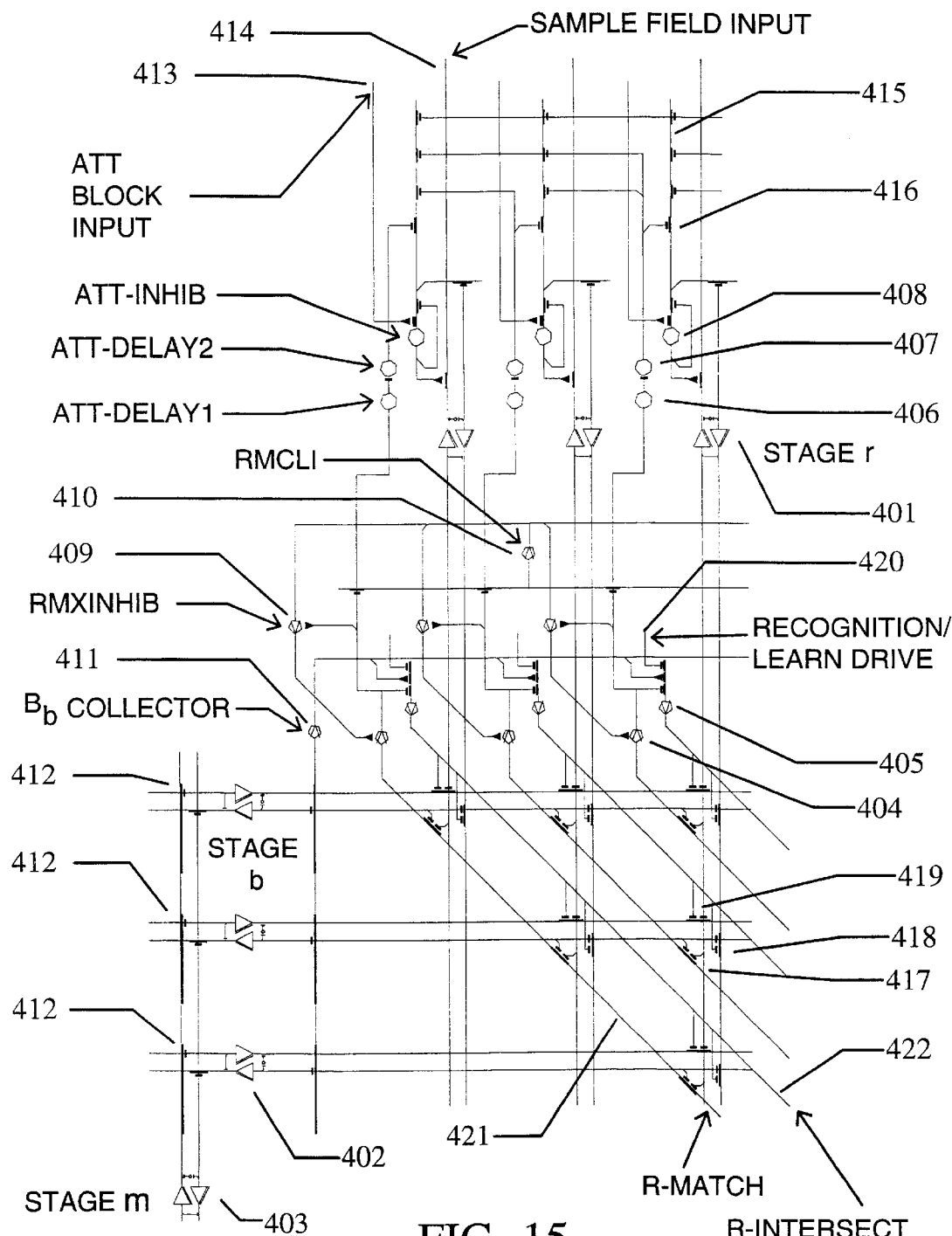
FIG. 15 shows r-b-m e-circuit with long-diagonal r-match diagonalization and attention focus. Though there are some small modifications for the specific application, discussed in the detailed description, the basic design and function of this e-circuit and its sub-circuits is described earlier. This e-circuit is used for 2-dimensional input field recognition by specifying the diagonal connection pattern to implement suitable mappings between stage r and stage b. The diagram illustrates all the e-circuit features used in the 2-dimensional recognition tasks discussed in the text, but the e-cell counts are reduced for clarity.

The Diagonalizing r-b-m E-circuit With Attention Focus: Configurations for Machine Vision Applications FIG. 15 shows r-b-m e-circuit with long-diagonal r-match diagonalization and attention focus. The design and function of this e-circuit and its sub-circuits is described at length earlier. This r-b-m e-circuit differs from those described in the associated application in that there are effectively two levels of cluster: sample cluster and strip cluster. In stage r 401 each cluster encodes the input 414 from the image sampling pattern. In the example shown the sample cluster size is 1, since the scalar output from each sample can be encoded in a single e-cell. For more complex encodings, such as those that would arise from multiple feature characterizations, the sample cluster size has to be large enough to carry that encoding. In stage b 412 the sample cluster remains the same as for stage r (in this case, 1) but each strip of the sampling pattern is treated as a higher level strip cluster. This level of clustering is not reflected in the interconnection to stage r 401, but is reflected in the connections to stage m in that each strip cluster maps onto a region of the stage m forward e-cells 412.

For circuits in which the sample cluster size is greater than 1, the number e-cell pairs in stage b must be:

sample_cluster_size×strip_cluster_size×strip_cluster_count

In this circumstance the region structure of stage m forward e-cells may or may not reflect the sample cluster structure, depending on how strictly the cluster encoding is to be enforced. In the strict enforcement case there must be a stage m forward region for each sample cluster:

region_count=strip_cluster_size×strip_cluster_count synapse_per_region=sample_cluster_size If the cluster encoding can be treated loosely, as an additive measure for example, then there can be stage m forward region for each strip cluster"

region_count=strip_cluster_count synapse_per_region=sample_cluster_size×sample_cluster_size The stage m forward dcf used to combine the regions in these differing cases will depend on the nature of the recognition task, with full adjunctive trees used for very stringent tasks and thresholded summation used for less stringent or more degradation tolerant tasks. The nature of the dcf options is discussed at length in and associated application E-Cell (Equivalent Cell) and The Basic Circuit Modules of E-Circuits: E-Cell Pair Totem, The Basic Memory Circuit and Association Extension.

Another difference between the r-b-m e-circuit used here and those described earlier is the connection pattern of the r-match/r-intersect diagonals 421, 422. As discussed above, the "diagonal" in vision applications implements a surjective mapping from stage r to stage b (and its inverse) such that the map implements one of the geometric image transforms required. Therefore the connection pattern for the diagonals has a number of scattered contiguous sections or may be entirely scattered. Scattered diagonalization is discussed earlier. The specifics of the mappings are discussed below.

A further difference between the circuit of FIG. 15 and those discussed earlier is that the output of r-match is one of the inputs to the attention focus circuitry.

Stage b 402 carries the percept. It must have as many e-cell pairs as required to carry the number of image samples times the sample cluster size in the largest stored percept. In the test circuit the percepts have a maximum size of 140 samples (14 by 10) at a sample cluster size of 1.

Stage r 401 carries the input image samples. It must have as many e-cell pairs as required to carry the number of image samples times the sample cluster size in the input field. In the test circuit the input field has 750 samples at a sample cluster size of 1. (See FIG. 21.)

Thus each r-match diagonal 421 has as many regions as there are backward e-cells in stage b (in this example circuit 140) with two synapses per region 417. Each region 417 is thresholded to require both inputs to be active in order for the region to have output. The r-match dcf sums the contributions of all the regions and applies a threshold so that a certain minimum number of regions must be contributing. The output of r-match 404 thus represents the number of matches detected on that diagonal, thresholded by some minimum number of matches. The outputs of all r-matches across stage r, (or in some variants, across some extent of stage r) are subjected to competition via the rmcli e-cell 410 and each paired rmxinhib e-cell 409, so that only the r-match e-cell 404 with the strongest output remains active. The output of the r-match e-cell 404 drives both the paired r-intersect e-cell 405 and an associated att-delay 1 e-cell 406. Thus, the winning r-match signal gives the clearest indication of the position within the input field of the pattern recognized as matching a pattern memorized in stage m.

The r-intersect e-cell 405 drive by the active r-match e-cell drives synapses 418, 419 along its diagonal 422 which are paired with the regions on the associated r-match diagonal 421. Those synapses 418, 419 gate the transfer of signals from stage r forward to stage b forward e-cells and from stage b backward to stage r backward e-cells, respectively. This mechanism is discussed at length earlier.

The att-delay 1 e-cell 406 driven by the active r-match e-cell slowly integrates that activity until its output exceeds the input threshold of the paired att-delay 2 e-cell 407. This is normally after a number of r-match activity cycles (see FIG. 24: 564, 567). When att-delay 2 e-cell 407 fires, it provides input to a number of att-inhib e-cells 408. If those driven att-inhib e-cells 408 also have input from their associated stage r backward e-cells, and are not currently inhibited by an attention blocking signal 413, then they inhibit image sample input 414 to the associated stage r forward e-cell. This mechanism is discussed at length earlier. The only difference between this version of the attention focus circuitry and that discussed in the associated application is that part of the driving signal is provided by r-match e-cells. The connectivity between the att-delay 2 e-cells 407 and the att-inhib e-cells 408 is such that only those stage r forward e-cells driving an active r-match e-cell and having activity on their paired stage r backward e-cell will be inhibited by the attention focus circuit activity. This blocks only those input samples corresponding to the active stage m backward activity of the recognized percept, thus segmenting this percept occurrence in the input image.

Note that the attention focus circuitry shown in FIG. 15 is only required in applications which require scene segmentation. For applications which involve identifying a single percept in one or more locations within a field or involve tracking of a single percept across the input field the attention focus circuitry will be omitted.

Mapping Diagonal Architecture

FIG. 17 shows in simplified block form the connection pattern of the diagonals which map between stage r and stage b. The numbers above the rectangle designation stage r e-cell pairs 461 correspond to the numbering of sampling areas in FIG. 16. FIG. 17 (a) illustrates a set of mapping diagonals which map several approximately congruent 2×3 "rectangular" sampling areas into the 2×3 stage b 462. These nearly congruent sampling areas allow translations of a pattern to be recognized. For example, in FIG. 16: <6–8, 32–34>are nearly congruent to <32–34, 66–68>and <66–68, 108–110>. In FIG. 17 (a) these congruencies are implemented by the mapping diagonals <469,470>and <471, 472>and <473, 474>respectively by mapping stage r extent 463 to stage b extent 467 and stage r extent 464 to stage b extent 468, mapping stage r extent 464 to stage b extent 467 and stage r extent 465 to stage b extent 468, mapping stage r extent 465 to stage b extent 467 and stage r extent 466 to stage b extent 468, respectively.

Figure 17A:
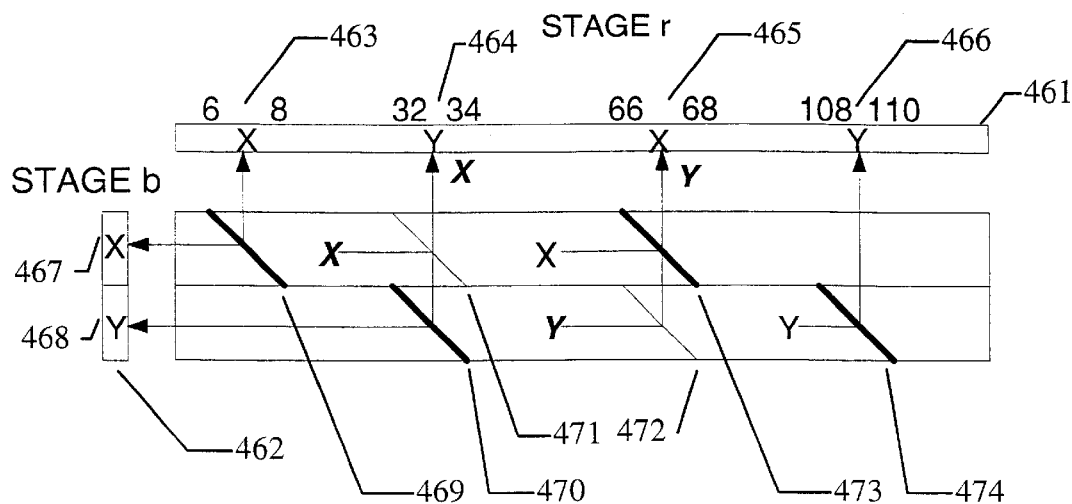
FIG. 17(a) illustrates a set of mapping diagonals which map several congruent 2×3 "rectangular" sampling areas into the 2×3 stage b. These congruent sampling areas allow translations of a pattern to be recognized.
Figure 17B:
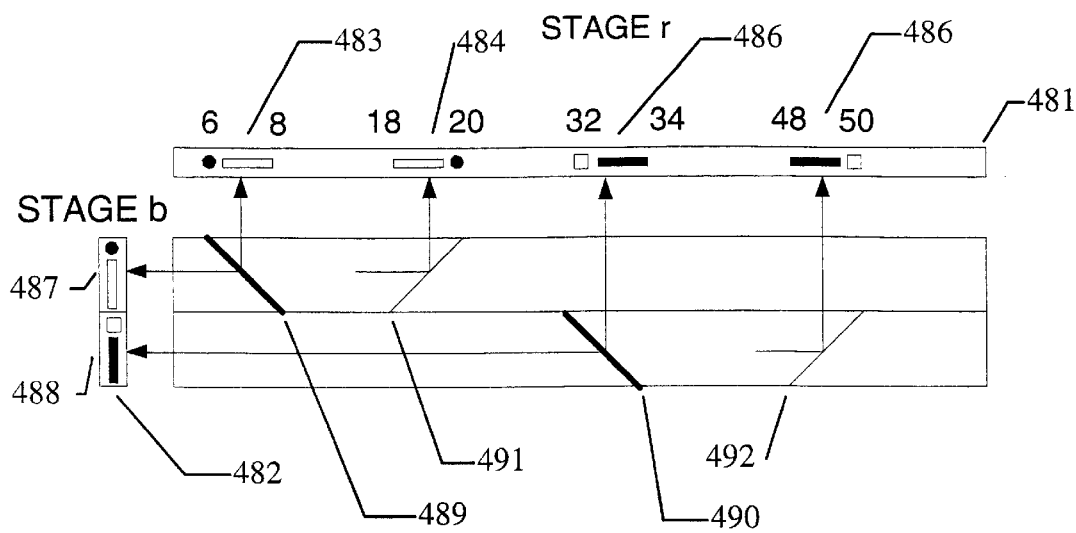
FIG. 17(b) illustrates a set of diagonal mappings which implement bilateral symmetrical recognition. The opposite "slope" of the contiguous section of the mapping diagonals allows a mirror image of a stored percept to be recognized.

FIG. 17 (b) shows a set of diagonal mappings which implement bilaterally symmetrical recognition. The opposite "slope" of the contiguous section of the mapping diagonals allows a mirror image of a stored percept to be recognized. For example, in FIG. 16 <20–18, 50–48>is a bilateral reflection of <6–8, 32–34>. In FIG. 17(b) this reflection is implemented by the mapping diagonals <489,490>and <491, 492>respectively by mapping stage r extent 483 to stage b extent 487 and stage r extent 485 to stage b extent 488, and by mapping stage r extent 484 to stage b extent 487 and stage r extent 486 to stage b extent 488. Thus the same store percept can respond to a pattern and its reflection on the opposite half of the sampling field. Note that because of the translational capability illustrated in FIG. 17(a), a bilaterally symmetrical stimulus does not have to be perfectly centered in the image sampling field for its bilateral symmetry to be recognized.

This is one example of using a mapping diagonal to implement a function other than translation.

Practical Sampling Fields

FIG. 18 illustrates one component of a practical sampling field. This consists of constant size samples arranged in concentric rings. It should be recalled that the actual sampling areas overlap to reduce aliasing problems, though they are illustrated without overlap (See FIG. 22: 532 and 534, for example). It can be seen that the constant size of the samples results in grid-like arrays which have an approximate constancy over substantial areas of the sampling field. For example, any contiguous small sets of samples in the area pointed to by 501 can be mapped to a very nearly congruent set of samples nearby. As the sets approach the center of the field, for example in area pointed to by 506, the rate of change of the curvature of the sample ring increases more quickly. In the practical application of recognition by the circuit, how "nearly" congruent are a sample set near 501 and a sample set near 506 depends on both the actual radius of the overlapping sample areas and the strictness of the dcf of the relevant stage m e-cell holding the percept. In tested examples the congruence fails when the edge of input sample nearest the center occludes about 80 degrees. Thus input patterns for this sampling field have to be held off center such that their maximum occlusion is less than this amount. Therefore within substantial segments of the sampling field translations of the percept may be accommodated by simple diagonal mappings.

Translations beyond these segments becomes more complicated. Whether or not such longer range translations even need to be accommodated depends on the application. If such translations are required then mappings which abandon the alignment of the sampling ring are required. In area pointed to by 504, for example, the contiguous extents of a diagonal would map along radials instead of rings, more or less. In the areas pointed to by 501 and 502 the contiguous extents of a diagonal would hop obliquely across rings. The accuracy of such mappings depends entirely on the resolution of the sampling grid relative to the feature size of the percepts being recognized. The alternative implementation is to accommodate translation only in limited segments, and to re-center the sampling pattern to place candidate targets in the "canonical" sampling areas. This has the advantage of reducing the diagonal counts, and allowing use of a lower resolution sampling field. The choice depends on the application. For example, if the typical recognition target has any regular axis, then very simple detectors can be used to align that axis with the center 507 of the sampling pattern, and thus very limited translation need be accommodated. Such targets include text, aircraft, faces, etc.

It can be seen that the area pointed to by 504 is a perfect rotation of the area pointed to by 501, while in areas pointed to by 502 and 503 there is some "stagger" between adjacent sampling rings which is not present in 501 and 504. However, the maximum stagger is half a sampling area, so if a percept is stored with a resolution reasonably high compared to its feature size, the stagger will barely affect the match between percept and pattern. Thus, areas pointed to by 502 and 503 may be very nearly as accurately mapped by diagonal as those areas pointed to by 501 and 504. Rotations about the center of the pattern are thus happily accommodated.

The area pointed to by 505 is both a rotation and a reflection of the area pointed to by 501, and may be mapped as both using diagonals of opposite slope.

Target patterns differing only by scale from a stored percept may be mapped by diagonals of increased or decreased slope, thus super-sampling or sub-sampling stage r onto stage b. Once again, this is practical if the sampling resolution of the field is high compared to the feature size of the percept.

An alternative solution to the scaling problem is to reproduce the sampling pattern in a self-similar manner at various scales. FIG. 19 shows a log polar scaling of the innermost ring of the pattern in FIG. 18. Once again, in practice the sampling patterns must overlap. In certain applications, scalings intermediate to those shown may be required.

The small sample of the combined patterns of FIGS. 18 and 19 are shown in FIG. 20. Various translations, rotations and scalings of the simple 3×2 percept sample are shown 510–515. 515 illustrates the stagger problem affecting pattern congruence or similarity (in the geometric sense) alluded to earlier in the discussion.

Other Input Sampling Patterns

The functioning of the e-circuit described is independent of the sampling pattern used to provide input. The same circuit can be used with rectilinear input arrays, hexagonal arrays or any other sampling pattern as input to stage r, so long as there exist the mappings to stage b which implement the transforms required by the application. Not all applications will require all transforms, or even the same set of transforms across the entire input field.

Behavior of the Image Recognition r-b-m E-Circuit

Figure 23:
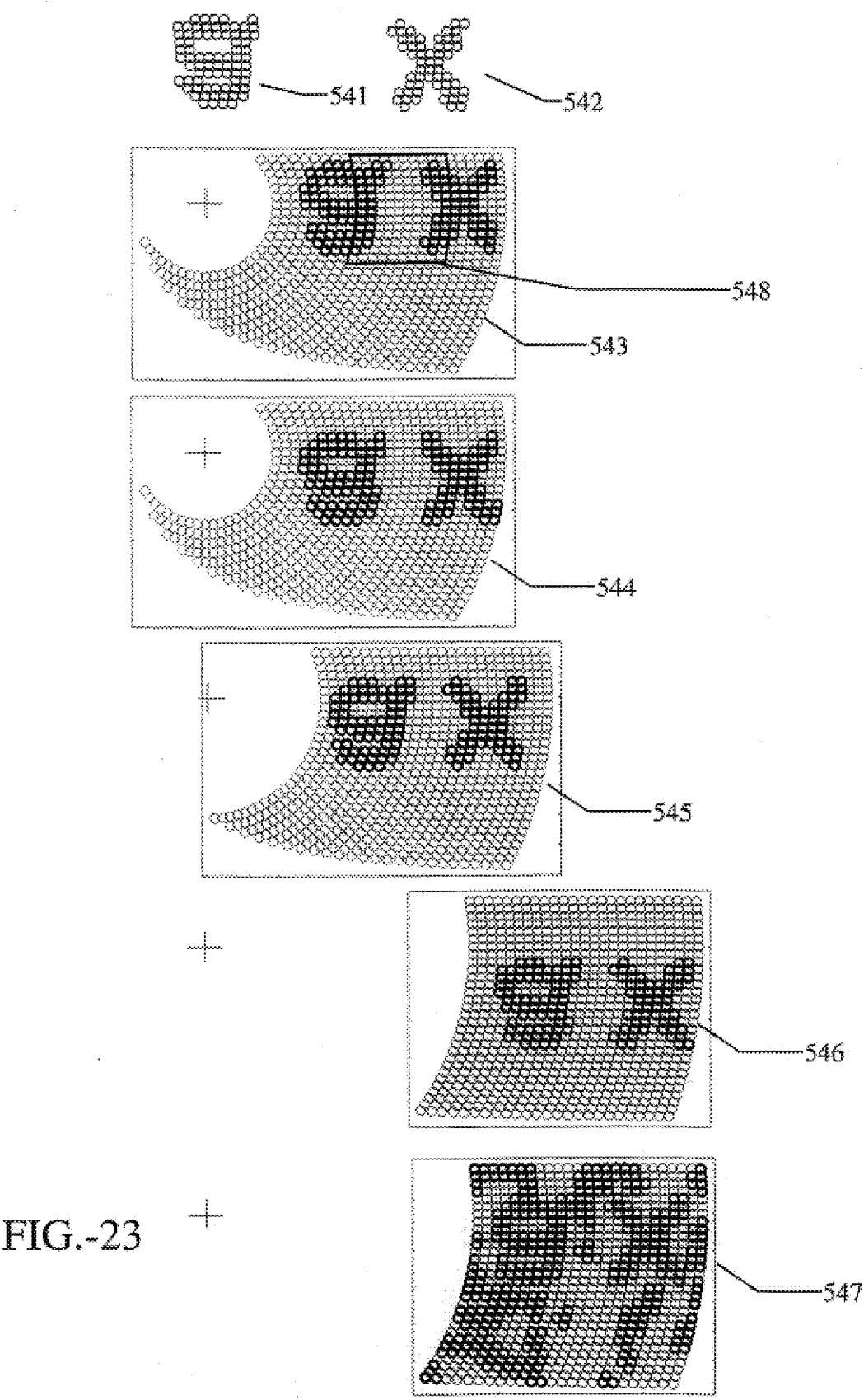
FIG. 23, first row, shows two percept patterns "a" and "x" trained into a test r-b-m e-circuit stage m by presentation on stage b.

The two images 530 and 531 in the top row of FIG. 22 are the images used to create the sampling patterns used to test the circuit in the examples shown. The top row FIG. 23 shows two independent patterns, an "a" (reflected vertically by the sampling) 541, and an "x" 542. These have been sampled by a subpattern extracted from arbitrary position 548 within the sampling field. They are presented to the circuit via stage b for capture in stage m. The e-cell activity of the capture is shown in FIG. 24: the top two traces 551 and 552 in the first two time intervals (i.e. under 555 and 556).

Subsequently one of the input patterns in the bottom five rows of FIG. 23 is presented 543-547. In each the targets are translated to different locations within the sampling pattern. It can be seen that each translation results in some aliasing and geometric distortion relative to the stored percepts 541, 542. The degree of translation for the third, fourth and fifth test patterns 545, 546, 547 is effected by displacing the sampling pattern to stay within the dimensions of stage r. The fifth test pattern 547 has distractor targets composed of fragments of the targets as well as other "noise" elements for which there are no corresponding stored percepts. This two dimensional image test corresponds to the one-dimensional sequence recognition tests with distractors illustrated earlier. All of the target patterns were successfully recognized, and the presence of distractors and noise in 547 did not interfere with the recognition of the two valid targets.

Figure 24:
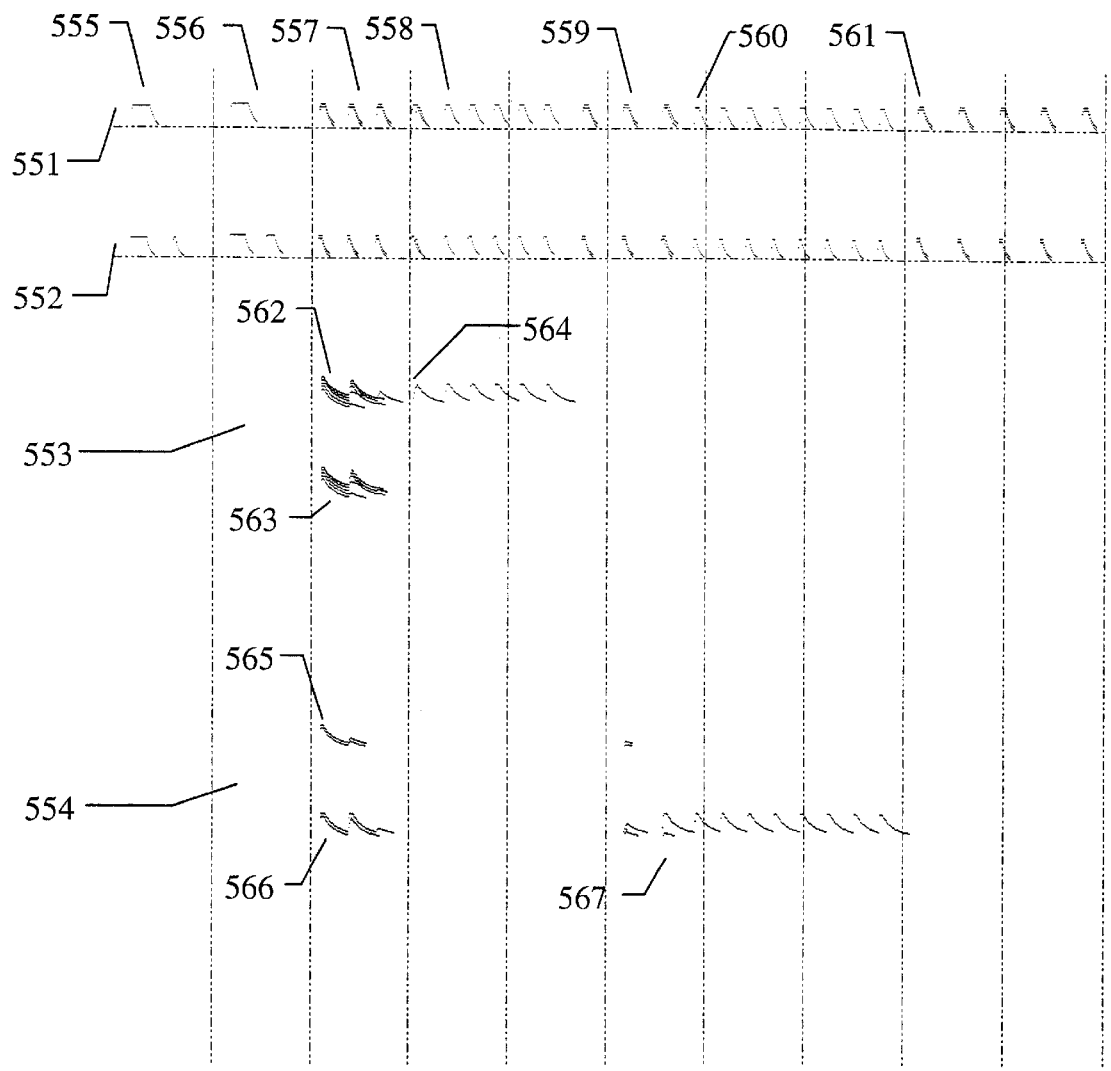
FIG. 24 shows the activity of two populations of e-cells in the r-b-m e-circuit during the presentation of the test pattern in FIG. 23 fifth row. The top two lines of activity recording show the responses of stage m backward and forward e-cells. The two left hand divisions show the training of the two percepts shown in FIG. 23, top row. The remaining divisions to the right show the response of those stage m e-cells when the pattern shown in the fifth row of FIG. 23 is presented starting the beginning of the third division. The lower e-cell activity recordings of FIG. 24 show the outputs of r-match e-cells. The two groups correspond to the outer pattern "x" and the inner pattern "a" respectively, in descending order.

FIG. 24 shows the activity pattern for two populations of e-cells during the training of the FIG. 23 training patterns 541 and 542 and the subsequent presentation of target pattern 546. The top two lines of activity recording show the responses of stage m backward 551 and forward 552 e-cells. The two left hand divisions 555, 556 show the training of 541 and 542 in FIG. 23. The remaining divisions to the right show the response of those stage m e-cells when the pattern 546 of FIG. 23 is presented starting the beginning of the third division. After several cycles of "sorting out" 557 the second percept "x" responds exclusively 558 until it is suppressed in the last half of the fifth division, whereupon after a few cycles of "sorting out" 559 the first percept "a" exclusively responds 560 until it is suppressed. After this only low frequency non-specific response 561 persists. The suppression of each recognized pattern is a result of the action of attention-focus e-circuitry described above and illustrated in FIG. 15.

The lower e-cell activity recordings of FIG. 24 show the outputs of r-match e-cells. The two groups 553, 554 correspond to the outer target "x" and the inner target "a" respectively of the test pattern 545, in descending order. Competing r-match e-cells adjacent to 562 and nearby 563 the winning e-cell 564 correspond to small translations in the vertical and horizontal directions respectively. Some initial matching of the "a" target 565, 566 are quickly suppressed as well by the successful competition of the dominant r-match e-cell 564.

It can be seen in FIG. 23 that small translations of the input pattern relative to the stored percept still result in significant intersection and thus some output on the corresponding r-match e-cells. However, the best intersection position results in the most active matching regions. Within a few cycles that strongest responding e-cell 564 suppressed the competitors 562, 563 via lateral inhibition.

Dimensions of r-b-m E-Circuit, Transistor Counts and Processing Rates

The e-circuit as implement with stage r, b and m dimensions of 750, 140 and 40 respectively has about 9000 e-cells with about 750,000 synapses. With a fast implementation, the sampling pattern can be segmented (with overlaps at least as large as the size of the largest stored percept) and multiplexed onto stage r serially. An e-circuit to service a useful size sampling pattern segment might be 10 to 30 times as large as the one tested. Assuming a generous recognition interval of 15 cycles per percept, it could service 10 segments of 32 sampling patterns of different scales in 4800 cycles. At a 1 Mhz cycle rate, the recognition rate would be about 200 percepts per second. This rate allows practical motion tracking or scene decomposition.

Even with the extra transistors needed to drive the e-cell fanout load the transistor count for e-circuits is dominated by the synapse count. Assuming an embodiment similar to that illustrated in FIG. 14, a practical machine vision e-circuit, as just described, would require in the order of 10–30 million transistors to implement, well within current integration levels.

Refer to associated application E-Cell (Equivalent Cell) and The Basic Circuit Modules of E-Circuits: E-Cell Pair Totem, The Basic Memory Circuit and Association Extension for details of e-cell implementation and e-circuit implementation, respectively.

What is claimed is:

1. A memory circuit, comprising:
   a stage-m stage m having $k_m$ stage-m e-cell pairs, each stage-m e-cell pair having $k_b$ stage-m forward input synapses and a stage-m backward output;
   a stage-b stage b having $k_b$ stage-b e-cell pairs, each stage-b e-cell pair having one or more stage-b forward input synapses, a stage-b forward output, $k_m$ stage-b backward input synapses, and a stage-b backward output; and
   a stage-r stage r having $k_r$ stage-r e-cell pairs, each stage-r e-cell pair having a stage-r forward input, a stage-r forward output, and one or more stage-r backward input synapses;
   wherein each of the $k_b$ stage-b forward outputs is coupled to a corresponding stage-m one of the $k_b$ stage-m forward input synapses, each of the $k_m$ stage-m outputs is coupled to a corresponding stage-b one of the $k_m$ stage-b backward input synapses, each of the $k_r$ stage-r forward outputs is coupled to one or more of the stage-b forward input synapses, and each of the $k_b$ stage-b backward outputs is coupled to one or more of the stage-r backward input synapses.

2. A memory circuit as in claim 1,
   wherein each stage-m e-cell pair has a stage-m dendritic input tree having $p_b$ regions each having a corresponding $q_b$ of the $k_b$ stage-m forward input synapses.

3. A memory circuit as in claim 2,
   wherein each stage-m dendritic input tree comprises an adjunctive tree coupled to its $p_b$ regions.

4. A memory circuit as in claim 2,
   wherein each stage-m dendritic input tree comprises a summation tree coupled to its $p_b$ regions;
   and wherein each of the $p_b$ regions applies a corresponding threshold value in determining a corresponding stage-m region output value.

5. A memory circuit as in claim 1, further comprising:
   $k_r$–$k_b$+1 r-match e-cells, each r-match e-cell having an r-match output and having $k_b$ match regions, each match region having a backward synapse coupled to a corresponding one of the stage-b backward outputs and having a forward synapse coupled to a corresponding one of the stage-r forward outputs.

6. A memory circuit as in claim 5, wherein each match region applies a match threshold value in determining a corresponding match region output value; and wherein, for i from 1 to $k_r-k_b+1$, and j from 1 to $k_b$, the backward synapse of the jth match region of the ith r-match e-cell is coupled to the jth stage-b backward output, and the forward synapse of the jth match region of the ith r-match e-cell is coupled to the (i+j)th stage-r forward output.

7. A memory circuit as in claim 5, further comprising:

$k_r-k_b+1$ r-intersect e-cells, each r-intersect e-cell having an r-intersect output coupled to $k_b$ stage-b forward input controlling synapses corresponding to the $k_b$ stage-b e-cell pairs and coupled to $k_b$ stage-r backward input controlling synapses corresponding to $k_b$ of the $k_r$ stage-r e-cell pairs.

8. A memory circuit as in claim 7, further comprising:

a stage-b backward collector e-cell having a stage-b backward collector output and $k_b$ stage-b backward collector input synapses, each stage-b backward collector input synapse coupled to a corresponding one of the $k_b$ stage-b backward outputs.

9. A memory circuit as in claim 8, wherein each r-intersect e-cell further has an r-intersect inhibitory input synapse coupled to the stage-b backward collector output and has an r-intersect excitatory input synapse coupled to a corresponding one of the r-match outputs; and wherein the stage-b forward input controlling synapses and the stage-r backward input controlling synapses are excitatory.

10. A memory circuit as in claim 9, wherein each r-intersect e-cell further has an r-intersect tonic drive excitatory input synapse coupled to a tonic drive signal.

11. A memory circuit as in claim 8, wherein each r-intersect e-cell further has an r-intersect excitatory input synapse coupled to the stage-b backward collector output and has an r-intersect inhibitory input synapse coupled to a corresponding one of the r-match outputs; and wherein the stage-b forward input controlling synapses and the stage-r backward input controlling synapses are inhibitory.

12. A memory circuit as in claim 7, further comprising:

an r-match collector e-cell having an r-match collector output and having $k_r-k_b+1$ r-match collector excitatory input synapses, each r-match collector excitatory input synapse coupled to a corresponding one of the r-match outputs; and $k_r-k_b+1$ r-match inhibitor e-cells, each r-match inhibitor e-cell having an r-match inhibitor excitatory input synapse coupled to the r-match collector output, an r-match inhibitor inhibitory input synapse coupled to the r-match output of a corresponding r-match e-cell, and an r-match inhibitor output coupled to an r-match inhibitory input synapse of the corresponding r-match e-cell.

13. A memory circuit as in claim 5, an attention focus circuit coupled to the stage-r stage r operative to inhibit intervals of the stage-r inputs upon matching of the intervals.

14. A memory circuit as in claim 13, wherein the attention focus circuit has $k_r-k_b+1$ attention focus r-match inputs each coupled to a corresponding one of the $k_r-k_b+1$ r-match outputs and has up to $k_r$ attention focus stage-r inputs each coupled to a corresponding one of $k_r$ stage-r backward outputs of the $k_r$ stage-r e-cell pairs.

15. A memory circuit as in claim 1, further comprising:

a random access memory which stores and retrieves $k_m k_b$ stage-m weight coefficients corresponding to the $k_m k_b$ stage-m forward input synapses and which stores and retrieves $k_m k_b$ stage-b weight coefficients corresponding to the $k_m k_b$ stage-b backward input synapses; and a digital to analog converter coupled to the random access memory for generating analog weight coefficients.

16. A memory circuit as in claim 1, further comprising:

a stage-b backward gain control storage element for storing and retrieving a stage-b backward gain factor value having a stage-b backward gain control output;

wherein each stage-b e-cell pair comprises a stage-b backward gain control amplifier having a stage-b backward gain factor input coupled to the stage-b backward gain control output of the stage-b backward gain control storage element, the stage-b backward gain control amplifier being coupled to the stage-b backward output.

17. A memory circuit as in claim 1, further comprising:

a stage-r forward gain control storage element for storing and retrieving a stage-r forward gain factor value having a stage-r forward gain control output;

wherein each stage-r e-cell pair comprises a stage-r forward gain control amplifier having a stage-r forward gain factor input coupled to the stage-r forward gain control output of the stage-r forward gain control storage element, the stage-r forward gain control amplifier being coupled to the stage-r forward output.

18. A memory circuit as in claim 7, further comprising:

an r-intersect gain control storage element for storing and retrieving an r-intersect gain factor value having an r-intersect gain control output;

wherein each r-intersect e-cell comprises an r-intersect gain control amplifier having an r-intersect gain factor input coupled to the r-intersect gain control output of the r-intersect gain control storage element, the r-intersect gain control amplifier being coupled to the r-intersect output.

19. A memory circuit as in claim 1, wherein each of the $k_m k_b$ stage-m forward input synapses and each of the $k_m k_b$ stage-b backward input synapses comprises a floating gate transistor in which the floating gate stores a synapse weight coefficient.

20. A recognition circuit, comprising:

a stage-m stage m having $k_m$ stage-m e-cell pairs, each stage-m e-cell pair having $k_b$ stage-m forward input synapses and a stage-m backward output;

a stage-b stage b having $k_b$ stage-b e-cell pairs, each stage-b e-cell pair having one or more stage-b forward input synapses, a stage-b forward output, $k_m$ stage-b backward input synapses, and a stage-b backward output;

a stage-r stage r having $k_r$ stage-r e-cell pairs, each stage-r e-cell pair having a stage-r forward input, a stage-r forward output, and one or more stage-r backward input synapses;

$k_r-k_b+1$ r-match e-cells, each r-match e-cell having an r-match output and having $k_b$ match regions, each match region having a backward synapse coupled to a corresponding one of the stage-b backward outputs and having a forward synapse coupled to a corresponding one of the stage-r forward outputs, such that the corresponding stage-b backward output and the corresponding stage-r forward output for each match region implement a connection in a discrete n-degree transform from the $k_r$ stage-r e-cell pairs of stage r to the $k_b$ stage-b e-cell pairs of stage b; and $k_r–k_b+1$ r-intersect e-cells, each r-intersect e-cell having an r-intersect output coupled to $k_b$ stage-b forward input controlling synapses corresponding to the $k_b$ stage-b e-cell pairs and coupled to $k_b$ stage-r backward input controlling synapses corresponding to $k_b$ of the $k_r$ stage-r e-cell pairs, such that the corresponding $k_b$ stage-r forward e-cells and the corresponding $k_b$ stage-b forward e-cells for each r-intersect output implement the discrete n-degree transform and the corresponding $k_b$ stage-b backward e-cells and the corresponding $k_b$ stage-m backward e-cells for each r-intersect output implement an inverse discrete n-degree transform, corresponding to the discrete n-degree transform formed by the corresponding r-match e-cell, from the $k_b$ stage-b e-cell pairs of stage b to the $k_r$ r-match e-cell pairs of stage r;

wherein each of the $k_b$ stage-b forward outputs is coupled to a corresponding stage-m one of the $k_b$ stage-m forward input synapses, each of the $k_m$ stage-m backward outputs is coupled to a corresponding one of the $k_m$ stage-b backward input synapses, each of the $k_r$ stage-r forward outputs is coupled to one or more of the stage-b forward input synapses, and each of the $k_b$ stage-b backward outputs is coupled to one or more of the stage-r backward input synapses.

21. A recognition circuit as in claim 20, wherein each of the $k_r–k_b+1$ discrete n-degree transforms formed by the $k_r–k_b+1$ r-match e-cells comprises a surjective mapping function.

22. A recognition circuit as in claim 21, wherein each surjective mapping function comprises a two-dimensional transform.

23. A recognition circuit as in claim 20, further comprising:

an attention focus circuit coupled to the stage-r stage r operative to inhibit intervals of the stage-r inputs upon matching of the intervals.

24. A memory circuit, comprising:

a memory stage m having $k_m$ memory devices, each memory device having $k_b$ memory inputs and a memory output;

a stage-b stage b having $k_b$ stage-b e-cell pairs, each stage-b e-cell pair having one or more stage-b forward input synapses, a stage-b forward output, $k_m$ stage-b backward input synapses, and a stage-b backward output; and a stage-r stage r having $k_r$ stage-r e-cell pairs, each stage-r e-cell pair having a stage-r forward input, a stage-r forward output, and one or more stage-r backward input synapses;

wherein each of the $k_b$ stage-b forward outputs is coupled to a corresponding one of the $k_b$ memory inputs, each of the $k_m$ memory outputs is coupled to a corresponding stage-b one of the $k_m$ stage-b backward input synapses, each of the $k_r$ stage-r forward outputs is coupled to one or more of the stage-b forward input synapses, and each of the $k_b$ stage-b backward outputs is coupled to one or more of the stage-r backward input synapses.

25. A memory circuit as in claim 24, wherein the memory stage m comprises an artificial neural net.

26. A memory circuit as in claim 25, wherein the artificial neural net has $k_b$ neural inputs and $k_m$ neural outputs.

27. A memory circuit as in claim 24, wherein each of the $k_r$ stage-r e-cell pairs comprises a forward stage-r wire, for coupling the stage-r forward input and the stage-r forward output.

28. A memory circuit as in claim 24, wherein each e-cell pair comprises:

a forward e-cell having a forward e-cell input region, a forward e-cell cell body, and a forward e-cell output; and a backward e-cell having a backward e-cell input region, a backward e-cell cell body, a backward e-cell excitatory synapse, and a backward e-cell output;

wherein the forward e-cell output is coupled to the backward e-cell excitatory synapse.

29. A memory circuit as in claim 24, wherein periodicity competition determines which memory device ultimately signals a match from among a plurality of initially responding memory devices.

* * * * *